United States Patent
Zhou et al.

(10) Patent No.: US 11,844,102 B2
(45) Date of Patent: Dec. 12, 2023

(54) ADAPTIVE NETWORK CODING FOR SIDELINK COMMUNICATIONS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/482,789

(22) Filed: Sep. 23, 2021

(65) Prior Publication Data
US 2023/0087316 A1    Mar. 23, 2023

(51) Int. Cl.
| | |
|---|---|
| *H04W 72/542* | (2023.01) |
| *H04W 80/02* | (2009.01) |
| *H04W 72/044* | (2023.01) |
| *H04W 72/20* | (2023.01) |

(52) U.S. Cl.
CPC ..... *H04W 72/542* (2023.01); *H04W 72/0466* (2013.01); *H04W 72/20* (2023.01); *H04W 80/02* (2013.01)

(58) Field of Classification Search
CPC ........... H04W 72/085; H04W 72/0406; H04W 72/0466; H04W 80/02
See application file for complete search history.

(56) References Cited

U.S. PATENT DOCUMENTS

| | | | | |
|---|---|---|---|---|
| 2016/0105899 | A1* | 4/2016 | Zhou | H04L 43/0829 370/329 |
| 2016/0255579 | A1* | 9/2016 | Tong | H04L 1/1867 370/311 |
| 2017/0310427 | A1* | 10/2017 | Wakabayashi | H04L 1/1887 |
| 2018/0234970 | A1* | 8/2018 | Hall | H04L 1/20 |
| 2020/0304247 | A1* | 9/2020 | Loehr | H04W 4/40 |
| 2020/0396024 | A1* | 12/2020 | Ganesan | H04L 1/1896 |

(Continued)

OTHER PUBLICATIONS

3GPP TSG RAN WG2 Meeting #107bis; R2-1912686, Source: Lenovo, Motorola Mobility, Title: SL HARQ protocol operation, Chongqing, China, Oct. 14-18, 2019. (Year: 2019).*

(Continued)

*Primary Examiner* — Mohammed S Chowdhury
(74) *Attorney, Agent, or Firm* — Holland & Hart LLP

(57) ABSTRACT

Methods, systems, and devices for wireless communications are described. Generally, a transmitting user equipment (UE) may send packets, via a sidelink channel, to a receiving UE based on a network coding configuration received from a base station. The receiving UE may decode the packet(s) according to the network coding configuration, and transmit information that indicates an efficiency of the network coding configuration for the sidelink channel to the base station and/or the transmitting UE. The base station may generate and transmit, to the receiving UE and the transmitting UE, one or more updated parameters for the network coding configuration based on the received information that indicates the efficiency of the network coding configuration for the sidelink channel. The transmitting UE may encode, and the receiving UE may decode, future sidelink packets based on the one or more updated parameters.

28 Claims, 21 Drawing Sheets

(56) References Cited

U.S. PATENT DOCUMENTS

| | | | |
|---|---|---|---|
| 2021/0006362 A1* | 1/2021 | Loehr | H04W 4/40 |
| 2021/0007002 A1* | 1/2021 | Kang | H04W 72/10 |
| 2021/0385029 A1* | 12/2021 | Guo | H04L 5/0082 |
| 2022/0070876 A1* | 3/2022 | Bangolae | H04W 24/08 |
| 2022/0085921 A1* | 3/2022 | Zhang | H04L 1/1854 |
| 2022/0217761 A1* | 7/2022 | Oh | H04L 1/0003 |
| 2022/0345251 A1* | 10/2022 | Lee | H04L 5/0055 |

OTHER PUBLICATIONS

3GPP TSG RAN WG1 #98; R1-1908219, Source: Fujitsu, Title: Discussion on mode 1 resource allocation for NR V2X, Prague, CZ, Aug. 26-30, 2019 (Year: 2019).*

3GPP TSG RAN WG2 Meeting #107; R2-1909066, Source: ZTE, Sanechips, Title: Consideration on NR V2X configured grant resource allocation, Prague, Czech Republic, Aug. 26-30, 2019. (Year: 2019).*

3GPP TSG RAN WG1 Meeting #96bis; R1-1904295, Source: Intel Corporation, Title: Network controlled sidelink resource allocation design for NR V2X communication, Xi'an, China, Apr. 8-12, 2019. (Year: 2019).*

* cited by examiner

ADAPTIVE NETWORK CODING FOR SIDELINK COMMUNICATIONS

FIELD OF TECHNOLOGY

The following relates to wireless communications, including adaptive network coding for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support adaptive network coding for sidelink communications. Generally, a first user equipment (UE) that receives and decodes a network coded message over a sidelink channel from a second UE may report information indicating an efficiency of the network coding configuration to a base station in communication with the first UE and the second UE. The base station may generate one or more updated network coding parameters (e.g., a network coding redundancy, a number of a set of packets or symbols, an encoding algorithm, a decoding algorithm, a resource allocation for the sidelink channel) based on the reported information indicating the efficiency of the network coding configuration for the sidelink. The base station may transmit the updated network coding parameter(s) to the transmitting UE and/or the receiving UE. The transmitting UE may encode, and the receiving UE may decode, future sidelink messages according to the updated network coding parameter(s), for example until the base station transmits additional updated network coding parameter(s).

A method for wireless communication at a first UE is described. The method may include receiving, from a base station, one or more network coding parameters associated with a network coding configuration for sidelink communications for the first UE, receiving, from a second UE via a sidelink channel, a packet encoded according to the network coding configuration, decoding the packet based on the one or more network coding parameters received from the base station, and transmitting a message including information that indicates an efficiency of the network coding configuration for the sidelink channel based on the decoding of the packet.

An apparatus for wireless communication at a first UE is described. The apparatus may include a processor, memory coupled with the processor, and instructions stored in the memory. The instructions may be executable by the processor to cause the apparatus to receive, from a base station, one or more network coding parameters associated with a network coding configuration for sidelink communications for the first UE, receive, from a second UE via a sidelink channel, a packet encoded according to the network coding configuration, decode the packet based on the one or more network coding parameters received from the base station, and transmit a message including information that indicates an efficiency of the network coding configuration for the sidelink channel based on the decoding of the packet.

Another apparatus for wireless communication at a first UE is described. The apparatus may include means for receiving, from a base station, one or more network coding parameters associated with a network coding configuration for sidelink communications for the first UE, means for receiving, from a second UE via a sidelink channel, a packet encoded according to the network coding configuration, means for decoding the packet based on the one or more network coding parameters received from the base station, and means for transmitting a message including information that indicates an efficiency of the network coding configuration for the sidelink channel based on the decoding of the packet.

A non-transitory computer-readable medium storing code for wireless communication at a first UE is described. The code may include instructions executable by a processor to receive, from a base station, one or more network coding parameters associated with a network coding configuration for sidelink communications for the first UE, receive, from a second UE via a sidelink channel, a packet encoded according to the network coding configuration, decode the packet based on the one or more network coding parameters received from the base station, and transmit a message including information that indicates an efficiency of the network coding configuration for the sidelink channel based on the decoding of the packet.

Some examples of the method, apparatuses, and non-transitory computer-readable medium described herein may further include operations, features, means, or instructions for estimating a loss probability for the packet, where the information that indicates the efficiency of the network coding configuration for the sidelink channel includes the estimated loss probability.

In some examples of the method, apparatuses, and non-transitory computer-readable medium described herein, estimating the loss probability may include operations, features, means, or instructions for estimating the loss probability based on a number of packets received by the first UE during a time period and a total number of packets transmitted by the second UE during the time period.

Some examples of the method, apparatuses, and non-transitory computer-readable medium described herein may further include operations, features, means, or instructions for estimating a loss probability for the packet and generating a redundancy parameter based on the estimated loss probability, where the information that indicates the efficiency of the network coding configuration for the sidelink channel includes the redundancy parameter.

Some examples of the method, apparatuses, and non-transitory computer-readable medium described herein may further include operations, features, means, or instructions for receiving, via a control message, an indication of a lookup table for the UE, where the redundancy parameter may be generated at least in part on the lookup table.

Some examples of the method, apparatuses, and non-transitory computer-readable medium described herein may further include operations, features, means, or instructions for transmitting, as part of the information that indicates the efficiency of the network coding configuration for the sidelink channel, a request to increase a redundancy parameter of the network coding configuration based on determining that the decoding of the packet was unsuccessful.

Some examples of the method, apparatuses, and non-transitory computer-readable medium described herein may further include operations, features, means, or instructions for transmitting, as part of the information that indicates the efficiency of the network coding configuration for the sidelink channel, a request to decrease a redundancy parameter of the network coding configuration based on determining that the decoding of the packet was successful.

In some examples of the method, apparatuses, and non-transitory computer-readable medium described herein, receiving the one or more network coding parameters may include operations, features, means, or instructions for receiving the one or more network coding parameters associated with the network coding configuration for the first UE via a medium access control control element (MAC-CE) signal or via a downlink control information (DCI) signal.

In some examples of the method, apparatuses, and non-transitory computer-readable medium described herein, transmitting the message including the information that indicates the efficiency of the network coding configuration for the sidelink channel may include operations, features, means, or instructions for transmitting the message via a MAC-CE signal or via an uplink control information (UCI) signal.

In some examples of the method, apparatuses, and non-transitory computer-readable medium described herein, the one or more network coding parameters include at least one of a coding redundancy, a number of a set of packets including the packet, an encoding algorithm, a decoding algorithm, a resource allocation for the sidelink channel, or any combination thereof.

Some examples of the method, apparatuses, and non-transitory computer-readable medium described herein may further include operations, features, means, or instructions for receiving, from the base station, a request to transmit the information that indicates the efficiency of the network coding configuration for the sidelink channel, where the information may be transmitted based on the request.

Some examples of the method, apparatuses, and non-transitory computer-readable medium described herein may further include operations, features, means, or instructions for transmitting, to the base station, a request to transmit the information that indicates the efficiency of the network coding configuration for the sidelink channel and receiving from the base station, a grant in response to the request, where the information may be transmitted based on the grant.

In some examples of the method, apparatuses, and non-transitory computer-readable medium described herein, the request to transmit the information that indicates the efficiency of the network coding configuration for the sidelink channel may be based on one of a condition of the sidelink channel or a quality of service target associated with the sidelink channel.

Some examples of the method, apparatuses, and non-transitory computer-readable medium described herein may further include operations, features, means, or instructions for receiving, from the base station, one or more updated network coding parameters associated with the network coding configuration for the UE, where the one or more updated network coding parameters may be different from the one or more network coding parameters, receiving, from the second UE via the sidelink channel, a second packet encoded according to the network coding configuration, and decoding the second packet based on the one or more updated network coding parameters.

In some examples of the method, apparatuses, and non-transitory computer-readable medium described herein, the message including the information that indicates the efficiency of the network coding configuration for the sidelink channel may be transmitted to at least one of the base station or the second UE.

A method for wireless communication at a base station is described. The method may include transmitting, to one or more UEs, one or more first network coding parameters associated with a network coding configuration for sidelink communications for the one or more UEs, receiving, from a first UE of the one or more UEs, a message including information that indicates an efficiency of the network coding configuration for a packet transmitted via a sidelink channel from a second UE to the first UE, and transmitting, to the second UE, one or more second network coding parameters associated with the network coding configuration based on the information that indicates the efficiency of the network coding configuration, where the one or more second network coding parameters are different from the one or more first network coding parameters.

An apparatus for wireless communication at a base station is described. The apparatus may include a processor, memory coupled with the processor, and instructions stored in the memory. The instructions may be executable by the processor to cause the apparatus to transmit, to one or more UEs, one or more first network coding parameters associated with a network coding configuration for sidelink communications for the one or more UEs, receive, from a first UE of the one or more UEs, a message including information that indicates an efficiency of the network coding configuration for a packet transmitted via a sidelink channel from a second UE to the first UE, and transmit, to the second UE, one or more second network coding parameters associated with the network coding configuration based on the information that indicates the efficiency of the network coding configuration, where the one or more second network coding parameters are different from the one or more first network coding parameters.

Another apparatus for wireless communication at a base station is described. The apparatus may include means for transmitting, to one or more UEs, one or more first network coding parameters associated with a network coding configuration for sidelink communications for the one or more UEs, means for receiving, from a first UE of the one or more UEs, a message including information that indicates an efficiency of the network coding configuration for a packet transmitted via a sidelink channel from a second UE to the first UE, and means for transmitting, to the second UE, one or more second network coding parameters associated with the network coding configuration based on the information that indicates the efficiency of the network coding configuration, where the one or more second network coding parameters are different from the one or more first network coding parameters.

A non-transitory computer-readable medium storing code for wireless communication at a base station is described. The code may include instructions executable by a processor to transmit, to one or more UEs, one or more first network coding parameters associated with a network coding configuration for sidelink communications for the one or more UEs, receive, from a first UE of the one or more UEs, a message including information that indicates an efficiency of the network coding configuration for a packet transmitted via a sidelink channel from a second UE to the first UE, and transmit, to the second UE, one or more second network coding parameters associated with the network coding configuration based on the information that indicates the efficiency of the network coding configuration, where the one or more second network coding parameters are different from the one or more first network coding parameters.

Some examples of the method, apparatuses, and non-transitory computer-readable medium described herein may further include operations, features, means, or instructions for receiving, in the message, an estimated loss probability for the sidelink channel and generating a redundancy parameter based on the estimated loss probability, where the one or more second network coding parameters may be based on the redundancy parameter.

Some examples of the method, apparatuses, and non-transitory computer-readable medium described herein may further include operations, features, means, or instructions for receiving, in the message, a redundancy parameter and where the one or more second network coding parameters may be based on the redundancy parameter.

Some examples of the method, apparatuses, and non-transitory computer-readable medium described herein may further include operations, features, means, or instructions for transmitting, via a control message, an indication of a lookup table for the first UE, where the redundancy parameter may be based on the lookup table.

In some examples of the method, apparatuses, and non-transitory computer-readable medium described herein, receiving the information that indicates the efficiency of the network coding configuration may include operations, features, means, or instructions for receiving a request to decrease a redundancy parameter of the network coding configuration, where the one or more second network coding parameters includes a decreased redundancy parameter.

In some examples of the method, apparatuses, and non-transitory computer-readable medium described herein, receiving the information that indicates the efficiency of the network coding configuration may include operations, features, means, or instructions for receiving a request to increase a redundancy parameter of the network coding configuration, where the one or more second network coding parameters includes an increased redundancy parameter.

In some examples of the method, apparatuses, and non-transitory computer-readable medium described herein, transmitting the one or more first network coding parameters associated with the network coding configuration may include operations, features, means, or instructions for transmitting the one or more first network coding parameters associated with the network coding configuration via a MAC-CE signal or via a DCI signal.

In some examples of the method, apparatuses, and non-transitory computer-readable medium described herein, the information that indicates the efficiency of the network coding configuration may be received via a MAC-CE signal or via a UCI signal.

In some examples of the method, apparatuses, and non-transitory computer-readable medium described herein, the one or more first network coding parameters include at least one of a coding redundancy, a number of subpackets per packet, an encoding algorithm, a decoding algorithm, or a resource allocation for the sidelink channel.

Some examples of the method, apparatuses, and non-transitory computer-readable medium described herein may further include operations, features, means, or instructions for transmitting, to the first UE, a request to transmit the information that indicates the efficiency of the network coding configuration for the sidelink channel.

In some examples of the method, apparatuses, and non-transitory computer-readable medium described herein, where the request to transmit the information that indicates the efficiency of the network coding configuration for the sidelink channel may be based on one of a condition of the sidelink channel or a quality of service target associated with the sidelink channel.

Some examples of the method, apparatuses, and non-transitory computer-readable medium described herein may further include operations, features, means, or instructions for receiving, from the first UE, a request to transmit the information that indicates the efficiency of the network coding configuration for the sidelink channel and transmitting, to the first UE, a grant in response to the request based on one of a condition of the sidelink channel or a quality of service target associated with the sidelink channel.

DETAILED DESCRIPTION

Figure 1:
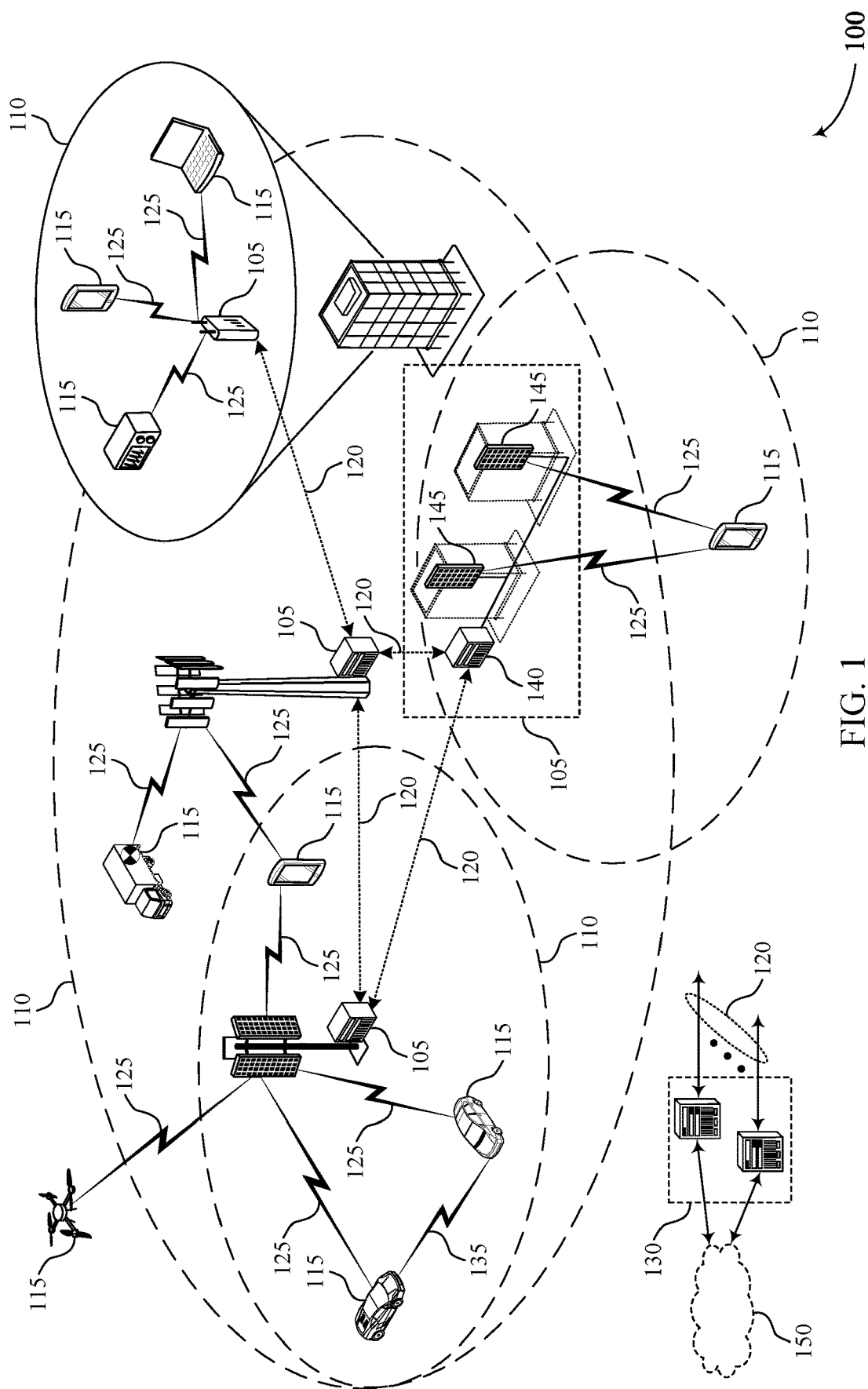
FIG. 1 illustrates an example of a wireless communications system that supports adaptive network coding for sidelink communications in accordance with aspects of the present disclosure.

In some wireless communications systems, a user equipment (UE) may communicate with one or more other UEs via sidelink connections. Some examples of sidelink communications may be device-to-device (D2D) communications, vehicle-to-vehicle (V2V) communications, vehicle-to-everything (V2X), etc. In some examples, a UE may use a sidelink connection with a neighboring UE to obtain or relay missed information from a previous downlink transmission. Some wireless communications systems may support network encoding procedures. In such procedures, a transmitting device (e.g., a UE or a base station) may encode a number (e.g., k) of original symbols or packets into a number (e.g., N) of encoded symbols or packets, where N is greater than k to introduce redundancy into a transmission, and increase the likelihood of successful decoding at the receiver. A receiver may receive and decode at least a number (e.g., M) of symbols or packets to recover the original packet(s) with a desired probability (e.g., 99%), where M is less than N, but greater than k. In some examples, M may be fixed for all receiving devices.

The amount of symbols M needed to be received to decode the k symbols or packet(s) with a given probability, however, may be dependent upon channel conditions between the transmitter and receiver. In some wireless communications systems (e.g., new radio (NR) systems), different communication links (e.g., a direct link between a transmitting device and multiple receiving devices, or sidelinks between UEs) may experience different channel conditions, resulting in different packet losses on the different communication links. If redundancy for all receiving devices is identical (e.g., inflexible), then some resources may be utilized inefficiently and some transmissions may be more likely to fail.

For example, a transmitting base station in communication with two receiving UEs may communicate via direct communication links having a low path loss. Additionally, a transmitting UE may communicate with a receiving UE via a sidelink having a high path loss. If the transmitting UE encodes and transmits signaling on the sidelink using the same redundancy configuration (e.g., network coding with a same N value) as the base station on the direct link, then transmission on the sidelink may not be successfully received (e.g., because the redundancy configuration of the network encoding on the sidelink is not high enough to compensate for the high packet loss). Or if the sidelink has a lower path loss than the direct link, transmissions on the sidelink may unnecessarily utilize more resources than necessary (e.g., introducing more redundancy than necessary and utilizing extra resources that may have otherwise been available for use for other communications). Thus, a fixed network coding redundancy for a sidelink configuration may result in inefficient use of available resources, failed transmissions, increased system latency, decreased reliability of communications, and decreased user experience.

A UE receiving messages (the receiving UE) via a sidelink channel from a second UE (the transmitting UE) may report feedback information that indicates an efficiency of the network coding configuration for the sidelink to a base station in communication with the receiving UE and the transmitting UE. In response, the base station may send an updated network coding configuration (e.g., one or more updated parameters associated with the network coding configuration) to the transmitting UE for future messaging based on the feedback information. In some examples, the receiving UE may send information that indicates an efficiency of the network coding configuration for the sidelink to the base station that includes or is based on an estimated packet loss probability calculated by the receiving UE for a sidelink message. A receiving UE may estimate the loss probability as the number of received symbols (or packets) divided by the total amount of symbols (or packets) transmitted over a period of time T. A desired redundancy may be determined by either the receiving UE or the base station based on the estimated loss probability. The desired redundancy R, may be given by $R=M/(1-p\_loss)-k$, where k is the original number of symbols (or packets) to encode, M is the number of symbols (or packets) the receiver may receive and decode in order to recover the original packet with a desired probability, and p_loss is the estimated loss probability. In some examples, the receiving UE may send the estimated packet loss probability, and then the base station may calculate an updated redundancy based on reported loss probability received from the receiving UE.

In some examples, the information that indicates an efficiency of the network coding configuration that may be sent by the receiving UE may include a network coding redundancy update request that may be based on a determination that decoding of a packet was successful or unsuccessful. For example, if the UE successfully decodes and recovers the original packet, the receiving UE may send a request to the base station to decrease the network coding redundancy (e.g., by a given amount or predetermined amount). If the receiving UE fails to decode the original packet, the receiving UE may send a request to the base station to increase the network coding redundancy (e.g., by a given amount or predetermined amount).

In some examples, the base station may allocate updated sidelink resources to the transmitting UE based on an updated coding redundancy. In some examples, the base station may also send updated network coding parameters for the sidelink (including, e.g., original k value, encoding/decoding algorithms, decodable set size M) to both the transmitting UE and the receiving UE based on the received information that indicates an efficiency of the network coding configuration for the sidelink.

In some examples, the base station may activate or deactivate, for example via a MCA-CE signal or a downlink control information (DCI), the ability of UEs to report information indicating the network coding efficiency to the base station, for example based on sidelink channel conditions or sidelink quality of service targets. The receiving UE may request, for example, via a MAC-CE signal or an uplink control information (UCI) signal (e.g., over the direct link), to activate or deactivate the ability to report information indicating the network coding efficiency to the base station, for example based on sidelink channel conditions or sidelink quality of service targets.

Aspects of the disclosure are initially described in the context of wireless communications systems. Aspects of the disclosure are further illustrated by and described with reference to encoding processes, wireless communications systems, and process flows. Aspects of the disclosure are further illustrated by and described with reference to apparatus diagrams, system diagrams, and flowcharts that relate to adaptive network coding for sidelink communications.

FIG. 1 illustrates an example of a wireless communications system 100 that supports adaptive network coding for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first UE 115 within the geographic coverage area 110 of a base station 105 may receive network coded messages from a second UE 115 within the geographic coverage area 110 via a sidelink channel 135. A base station 105 may transmit, over direct communication links 125, a configuration message to the UEs 115 including one or more parameters associated with a network coding configuration for data packets transmitted between the UEs 115 via the sidelink channel 135. In some examples, the one or more parameters may be configured by an RRC configuration. For example, parameters associated with a network coding configuration may include a coding redundancy, a number of a set of packets, an encoding algorithm, a decoding algorithm, or a resource allocation for the sidelink channel 135.

After receiving a network coded message from the second UE 115, the first UE 115 may decode the message based on the configuration message received from the base station 105. The first UE 115 may transmit a message, for example, to the base station 105, including information that indicates an efficiency of the network coding configuration for the sidelink channel 135 based on the decoding of the packet. In response to receiving the information that indicates an efficiency of the network coding configuration for the sidelink channel 135, the base station 105 may generate one or more updated parameters for the network coding configuration for the sidelink 135. For example, the base station 105 may generate an updated network coding redundancy parameter based on an estimated loss probability reported by the receiving UE 115. In some examples, the receiving UE 115 may transmit, to the base station 105, a desired network coding redundancy based on an estimated loss probability, and the base station 105 may generate updated parameter(s) associated with the network coding configuration based on the received desired network coding redundancy. In some examples, the receiving UE 115 may transmit, to the base station 105, a request to increase or decrease the network coding redundancy based on whether the receiving UE 115 unsuccessfully or successfully decoded a packet transmitted from the transmitting UE 115 via the sidelink channel 135, and the base station 105 may generate updated parameter(s) associated with the network coding configuration based on the received request.

Figure 2:
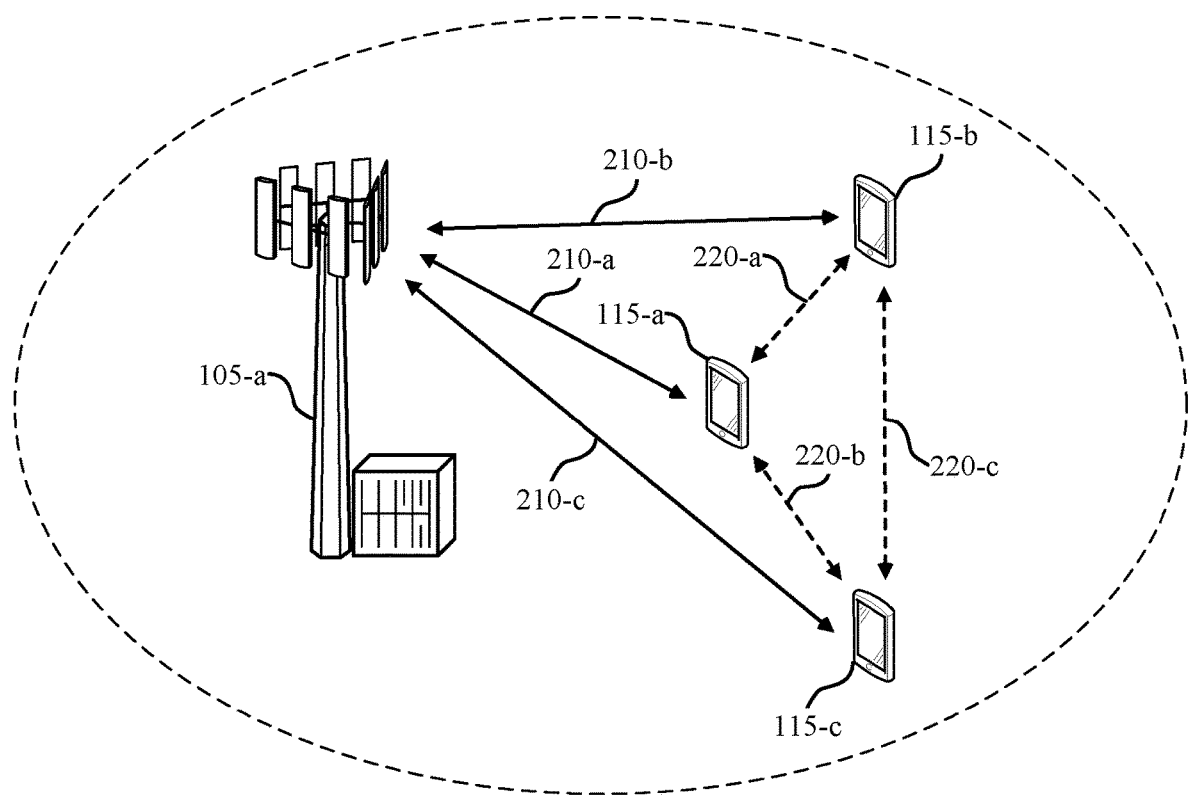
FIG. 2 illustrates an example of a wireless communications system that supports adaptive network coding for sidelink communications in accordance with aspects of the present disclosure.

FIG. 2 illustrates an example of a wireless communications system 200 that supports adaptive network coding for sidelink communications in accordance with aspects of the present disclosure. In some examples, wireless communications system 200 may implement or may be implemented by aspects of wireless communications system 100. For example, the wireless communications system 200 may include a base station 105-a, which may be an example of a base station 105 as described herein, and UE 115-a, UE 115-b, and UE 115-c which may be examples of UEs 115 as described herein.

The base station 105-a may communicate with one or more UEs 115. For example, the base station 105-a may communicate with UE 115-a via direct link 210-a, UE 115-b via direct link 210-b, and UE 115-c via direct link 210-c. Additionally, at least some of the UEs 115 may communicate with each other via sidelink connections. For example, UE 115-a may communicate with UE 115-b using sidelink connection 220-a, UE 115-b may communicate with UE 115-c using sidelink connection 220-c and UE 115-c may communicate with UE 115-a using sidelink connection 220-b.

In some examples, the sidelink connections 220 may be configured by the base station 105-a. For example, the base station 105-a may configure communications and reporting for the sidelink connections 220. In some cases, communications on the sidelink connections 220 may be configured by the base station 105-a. For example, the base station 105-a may transmit grants for sidelink communications to the UEs 115. The base station 105-a may indicate allocated resources, carrier frequencies, modulation and coding scheme values, transmission start and end times, etc. for communications on a sidelink connection 220. In some cases, the UEs 115 may communicate on the sidelink connections 220 according to the configurations from the base station 105-a.

The wireless communications system 200 may support network coding procedures. Network coding may enable devices to create a function of information from a set of data packets and transmit the function of the data packets to a UE 115 (e.g., network coded packets). Network coding may improve system efficiency and reliability. A device may generate a set of network coded packets by merging some information from data packets together into network coded packets. For example, the network coded packets may include some information from each of the data packets. For example, metadata from two separate data packets may be merged into a network coded packet. A receiver may be able to retrieve the original data packet if the receiver obtains sufficient information for the data packet from the network coded packets. In some cases, the transmitter and the receiver may have the same set of network coding parameters to encode and decode the network coded packets, so that the receiver and decode the network coded packets and obtain the original data packets.

The base station 105-a may utilize network coding to transmit a message to one or more UEs 115. For example, the base station 105-a may transmit network coded packets to the one or more UEs 115 via a direct links 210 instead of transmitting each individual data packet. The base station 105-a may indicate a set of network coding parameters to the one or more UEs 115. The network coding parameters may be synchronized between the base station 105-a and the one or more UEs 115 to ensure that the one or more UEs 115 can decode the network coded packets and retrieve the original data packets. The set of network coding parameters may include, for example, an encoding matrix, an encoding function, a decoding function, a number of decoding iterations (e.g., a maximum number of decoding iterations) or any combination thereof. In some cases, the base station 105-a may configure the one or more UEs 115 with one or more sets of network coding parameters via the direct links 210.

Wireless communications systems described herein, such as the wireless communications system 200, support sending network coded packets on a sidelink connection 220. For example, the UEs 115 may utilize network coding to generate network coded packets and transmit network coded information on sidelink connections. To support network coding techniques on a sidelink connection, the base station 105-a may configure the UEs 115 with one or more sets of network coding parameters. Configuring the UEs 115 with the one or more sets of network coding parameters may support transmission and decoding of network coded packets on a sidelink connection 220.

In some examples, a UE 115 may generate network coded packets for the sidelink connection 220 using the same network coding parameters as the direct links 210. For example, the base station 105-a may configure the UEs 115 with a set of network coding parameters. The set of network coding parameters may be used to generate network coded packets which are transmitted on the direct links 210. A UE 115 may use the set of network coded parameters to encode data packets and transmit the encoded packets to UEs 115 in need on a sidelink connection 220. For example, base station 105-a may configure UE 115-a to encode data packets missing at UE 115-b using the set of network coding parameters. The base station 105-a may configure UE 115-a to transmit functions of the data packets to UE 115-b. UE 115-b may receive the encoded packets and use the set of network coding parameters to decode the packets. For example, UE 115-b may decode the packets similar to decoding network coded packets transmitted on the direct links 210. UE 115-b may obtain the missing data packets and send feedback to the base station 105-a to indicate the data packets were successfully decoded. UE 115-a may similarly transmit network coded packets to UE 115-c for any missing data packets at UE 115-c.

In some cases, the base station 105-a may configure the UEs 115 with multiple sets of network coding parameters. For example, the base station 105-a may preconfigure the UEs 115 with a first set of network coding parameters and a second set of network coding parameters. In some examples, the UEs 115 may use the first set of coding parameters for direct link communications and use the second set of coding parameters for sidelink communications. Additionally, or alternatively, the UEs 115 may be configured with multiple sets of network coding parameters which may be used for the direct links 210, the sidelink connections 220, or both. For example, the base station 105-a may configure UE 115-a to encode data packets missing at UE 115-b using the second set of network coding parameters. UE 115-a may transmit the function of the data packets to UE 115-b on sidelink connection 220-a. UE 115-b may receive the encoded packets, extract the second set of network coding parameters and decode the data packets. In some cases, UE 115-a may indicate that the second set of network coding parameters were used to generate the network coded packets sent on sidelink connection 220-a. UE 115-a may similarly transmit network coded packets to UE 115-c for any missing data packets at UE 115-c.

In some examples, network coding may be activated or deactivated for the sidelink connections 220. For example, the base station 105-a and the UEs 115 may activate or deactivate network coding based on channel quality, an overhead budget, or both. For example, if the channel quality is above a threshold or the overhead budget is below a threshold, network coding may be deactivated. For example, if network coding is deactivated, UE 115-a may send the original data packets to the UEs 115 missing data packets. Alternatively, if the channel quality value is below a threshold and the overhead budget is above a threshold, network coding may be activated. In some cases, the base station 105-a activate or deactivate network coding on the sidelink connections. For example, the base station 105-a may determine the channel quality based on feedback from the UEs 115. The base station 105-a may indicate activation or deactivation via a MAC control element (MAC-CE) or downlink control information. In some cases, the UEs 115 may request to activate or deactivate network coding on the sidelink connections 220. For example, the UEs 115 may detect data transmission quality on the sidelink connections 220 and send a request to activate or deactivate network coding to the base station 105-a. The request to activate or deactivate may be sent via MAC-CE or uplink control information.

Figure 3:
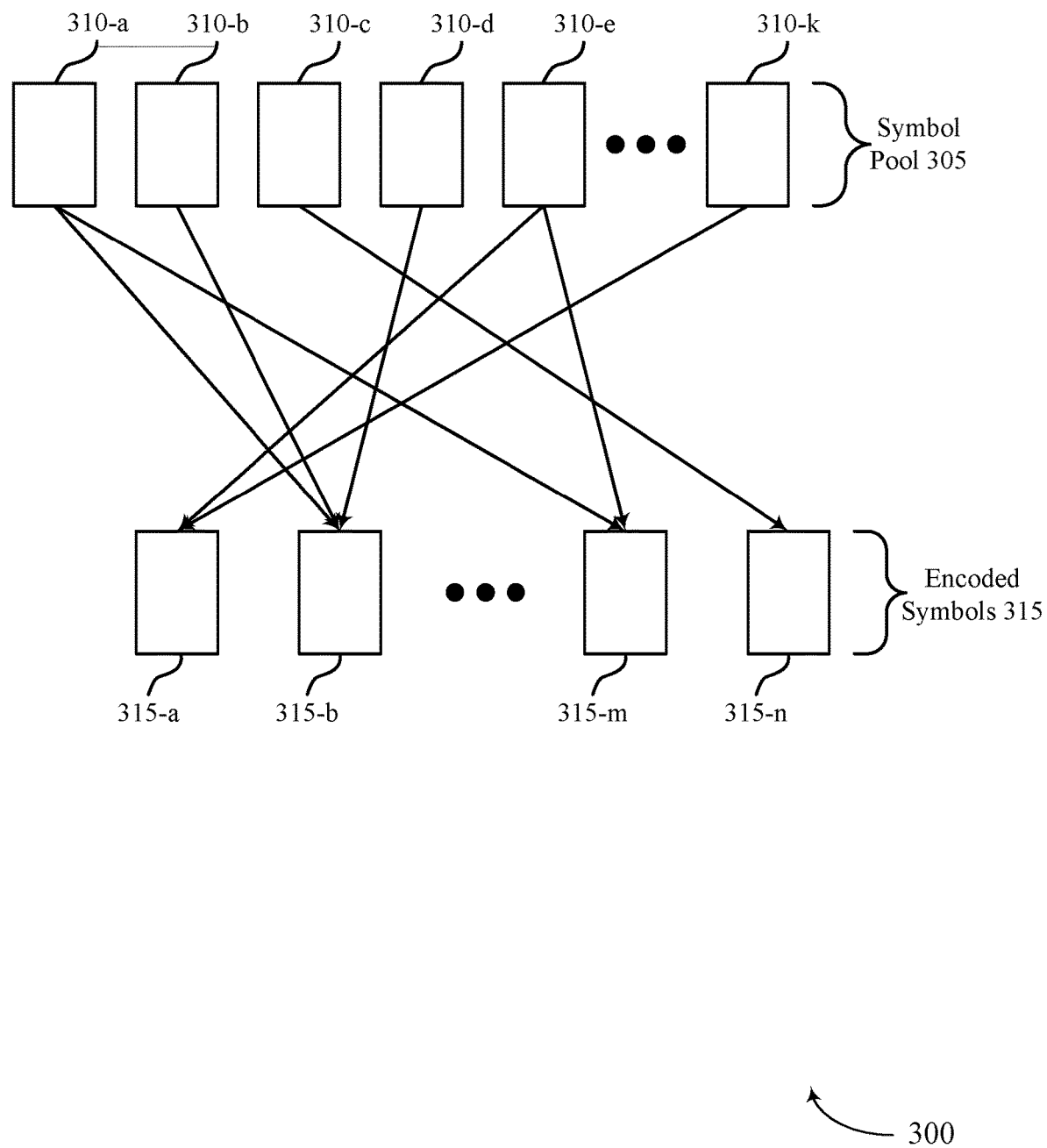
FIG. 3 illustrates an example of an encoding process that supports adaptive network coding for sidelink communications in accordance with aspects of the present disclosure.

FIG. 3 illustrates an example of an encoding process 300 that supports adaptive network coding for sidelink communications in accordance with aspects of the present disclosure. In some examples, encoding process 300 may implement aspects of or may be implemented by aspects of wireless communications systems 100 or 200. For example, encoding process 300 may include a fountain code, such as a rateless code that can be used by a base station 105 and/or a UEs 115 to encode a set of one or more packets. In particular, encoding process 300 may represent a Luby transform code, network encoding, or the like, that a transmitting device or encoder (e.g., a base station 105 or UE 115) uses when encoding a set of packets to transmit to a receiving device or decoder (e.g., a UE 115 or a base station 105).

The encoder may select a set of symbols from a symbol pool 305 to encode for transmitting to the decoder. For example, the symbol pool 305 may include k symbols 310, such as a first symbol 310-a, a second symbol 310-b, a third symbol 310-c, a fourth symbol 310-d, a fifth symbol 310-e, etc., to an k-th symbol 310-n. Each of the selected symbols 310 from the symbol pool 305 may be encoded by the encoder (e.g., the transmitting device, such as a UE 115, 115-a, 115-b, or 115-c or base station 105 or 205) to one or more encoded symbols 315, such as a first encoded symbol 315-a, a second encoded symbol 315-b, an m-th encoded symbol 315-m, and an n-th encoded symbol 315-n. The encoder may encode a number N encoded symbols 315, where N>k. In some cases, the encoding of the symbols 210 to the encoded symbols 315 may depend on a packet pool encoding function, f, on which the encoder is operating. For example, the packet pool encoding function, f, may include the encoder determining a degree, d, of each encoded symbol 315.

The degree may be chosen at random from a given node degree distribution, p(x). Subsequently, the encoder may choose 'd' distinct symbols 310 (e.g., information symbols) from the symbol pool 305 uniformly at random. These 'd' distinct symbols may be elements of the encoded symbol 315. For example, d=2 for the first encoding symbol 315-a with the fifth symbol 310-e and the n-th symbol 310-n being the elements of the first encoding symbol 315-a, d=3 for the second encoding symbol 315-b with the first symbol 310-a and the second symbol 310-b and the fourth symbol 310-d being the elements of the second encoding symbol 315-b, d=2 for the m-th encoding symbol 315-m with the first symbol 310-a and fifth symbol 310-e being the elements of the m-th encoding symbol 315-m, and d=1 for the n-th encoding symbol 315-n with the third symbol 310-c being the element of the n-th encoding symbol 315-n. The encoder may assign an exclusive or (XOR) operation of the chosen 'd' symbols 310 (e.g., information symbols) to the encoding symbol 315.

In some cases, an ideal soliton distribution for the encoding process may include P1=1/k or Pi=1/i(i−1) for i=2, 3, . . . , k, with k representing the number of symbols 210 in the symbol pool 305. Additionally or alternatively, a robust soliton distribution for the encoding process may include Mi=(Pi+Ti)/B, for i=1, 2, . . . , k, where R/ik for i=1, . . . , k/R−1; Ti=R ln(R/δ)/k for i=k/R or Ti=0 for $$i = \frac{k}{R} + 1, ..., k;\ R = c\ln(k/\delta)\sqrt{k},$$

where c is constant and δ is a decoding error probability; and B=sum(Pi+Ti) is a normalization factor.

Additionally, a decodability threshold value, M (e.g., a decodable threshold), may be defined for encoding process 300 (e.g., using Luby Transform encoding). As long as a number of network encoded packets or symbols received at a receiving device is greater than or equal to D, decoding of a message carried by the network encoded packets can be successful for the receiver. In some examples, if M=k, then the decoding success probability for the receiving device may be up to 99%. If M=k+1, then the decoding success probability for the receiving device may be up to 99.99%. If M=k+2, then the decoding success probability for the receiving device may be up to 99.9999%.

For a decodable set with M, k<M<N. The size of N may be increased to improve reliability, or decreased to lessen unnecessary redundancy. That is, increased redundancy by an encoder may result in improved reception at a receiving device. However, if redundancy is increased too much, the system may experience increased delays due to inefficient utilization of available resources.

In some examples, as described in greater detail with reference to FIG. 4, a transmitting device may communicate with multiple receiving devices via multiple communication links. Further, multiple transmitting devices in a network (e.g., within the geographic coverage area 110 of a base station 105) may communicate via multiple links (e.g., with respect to FIG. 2, a 115-a, 115-b, or 115-c may communicate with a base station 105-a via a direct link 210-a, 210-b, or 210-c.) In such examples, different communication links (e.g., between a transmitting device and multiple receiving devices) may experience different channel conditions, resulting in different packet losses on the different communication links. If redundancy for all receiving devices is identical (e.g., inflexible), then some resources may be utilized inefficiently, and some transmissions may be more likely to fail.

For example, as illustrated in FIG. 2, a transmitting device (e.g., UE 115-a) may communicate with a base station 105-a via a direct link 210-a and with another UE 115-b via a sidelink 220-a. The sidelink 220-a may have a different path loss than the direct link 210-a (e.g., the sidelink 220-a may have high path loss and the direct link 210-a may have a low path loss, or vice versa). If the UE 115-*a* encodes and transmits signaling on both links using the same redundancy configuration (e.g., network coding with a same N value), then transmission on the sidelink 220-*a* may not be successfully received (e.g., because the redundancy configuration of the network encoding on the sidelink 220-*a* is not high enough to compensate for the high packet loss), while transmissions on the direct link 210-*a* may unnecessarily utilize more resources than necessary (e.g., introducing more redundancy than necessary and utilizing extra resources that could be used for other communications). Thus, a fixed network coding redundancy configuration (e.g., a fixed N value) may result in inefficient use of available resources, failed transmissions, increased system latency, decreased reliability of communications, and decreased user experience.

A receiving UE 115, for example UE 115-*b* as illustrated in FIG. 2, may support adaptive network coding for sidelink communications, as described herein. For example, after receiving a network coded message from a UE 115-*a* via a sidelink channel 220-*a*, a receiving UE 115-*b* may decode the message based on one or more parameters in a network coding configuration message received from the base station 105-*a*. The receiving UE 115-*b* may transmit a message, for example, to the base station 105-*a*, including information that indicates an efficiency of the network coding configuration for the sidelink channel 220-*a* based on the decoding of the packet. In response to receiving the information that indicates an efficiency of the network coding configuration for the sidelink channel 220-*a*, the base station 105-*a* may generate updated network coding parameters. For example, the base station 105-*a* may generate an updated network coding redundancy parameter based on an estimated loss probability reported by the receiving UE 115-*b*.

In some examples, the receiving UE 115-*b* may transmit, to the base station 105-*a*, a desired network coding redundancy based on an estimated loss probability, and the base station 105-*a* may generate updated network coding parameters based on the received desired network coding redundancy. In some examples. the receiving UE 115-*b* may transmit, to the base station 105-*a*, a request to increase or decrease the network coding redundancy based on whether the receiving UE 115-*b* unsuccessfully or successfully decoded the packet transmitted from the transmitting UE 115 via the sidelink channel 220-*b*, and the base station 105-*a* may generate updated network coding parameters based on the received request. The base station 105-*a* may transmit the updated network coding parameters to the transmitting UE 115-*a* and the receiving UE 115-*b* for the sidelink channel 220-*a*. The transmitting UE 115-*a* may encode future sidelink messages transmitted to the receiving UE 115-*b* according to the updated network coding parameters transmitted by the base station 105-*a*, for example, until the transmitting UE 115-*a* receives additional updated network coding parameters from the base station 105-*a*.

Figure 4:
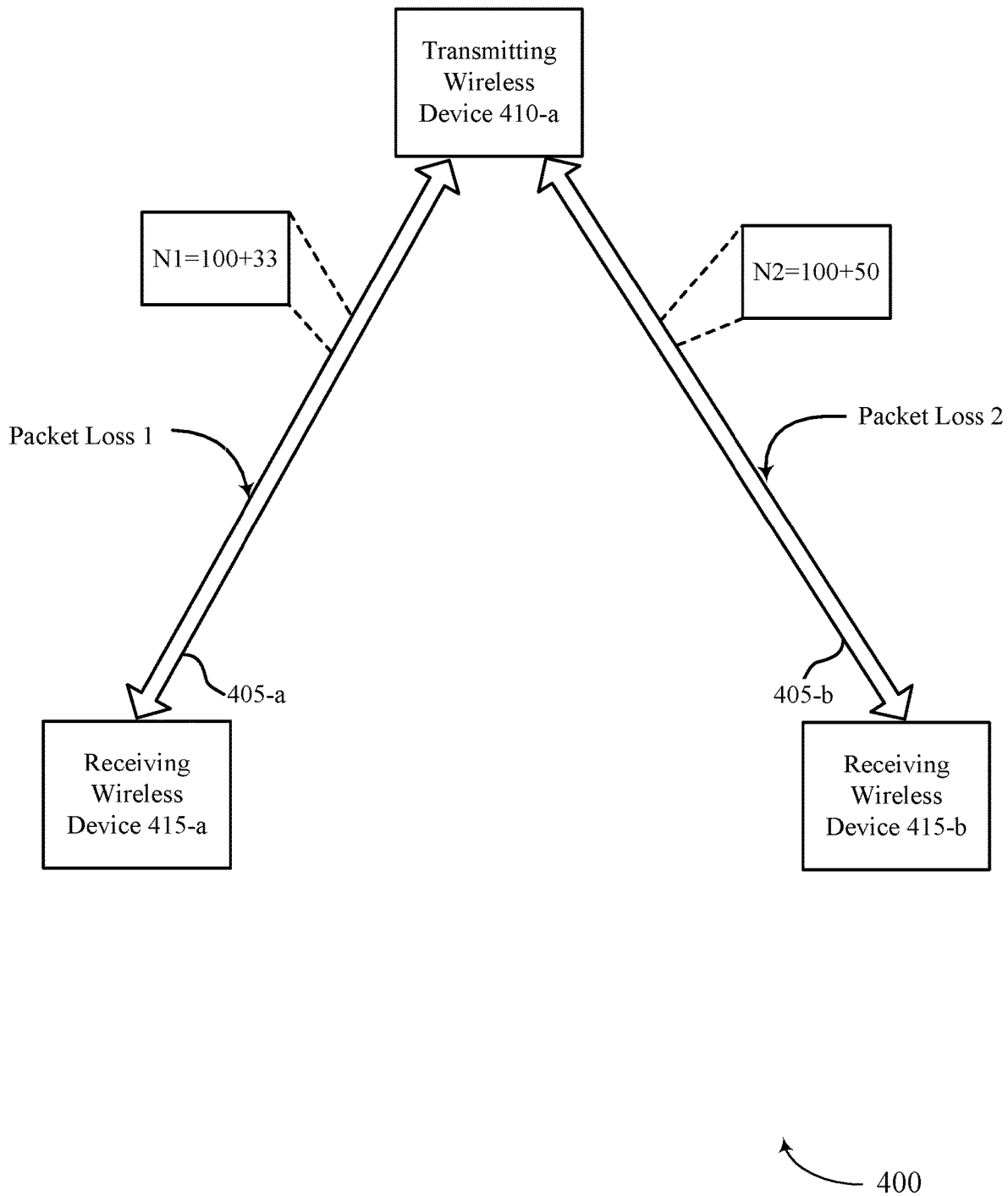
FIG. 4 illustrates an example of a wireless communications system that supports adaptive network coding for sidelink communications in accordance with aspects of the present disclosure.

FIG. 4 illustrates an example of a wireless communications system 400 that supports adaptive network coding for sidelink communications in accordance with aspects of the present disclosure. Wireless communications system 400 may implement aspects of or may be implemented by aspects of wireless communications systems 100 or 200. For example, wireless device 410-*a* may be a transmitting wireless device communicating with one or more receiving wireless devices 415. Transmitting wireless device 410-*a* may be an example of any transmitting device, such as a base station 105 as described herein, a UE 115 as described herein, or the like. Transmitting wireless device 410-*a* may communicate with receiving wireless device 415-*a* via communication link 405-*a*, and with receiving wireless device 415-*b* via communication link 405-*b*. The receiving wireless devices 415 may be, for example, UEs 115 or base stations 105 as described herein. The communication links may be Uu interfaces, PC5 interfaces, or the like.

The transmitting wireless device 410-*a* may encode and transmit control and data signaling to receiving wireless devices 415. In some examples, the transmitting wireless device 410-*a* may perform encoding (e.g., fountain coding, such as network encoding) on k original symbols (e.g., where k=100) as described in greater detail with reference to FIG. 3. In such examples, the transmitting wireless device 410-*a* may send N encoded symbols or packets to a receiving wireless device 315. Each receiving wireless device 415 may need M encoded symbols or packets (e.g., where M<N) to recover the original symbols or packets encoded by the transmitting wireless device 410-*a*. For a given performance target, in some examples, a decoding success probability M may be fixed (e.g., M=120).

As described herein, different communication links may experience different channel conditions, resulting in different packet losses. For instance, communication link 405-*a* may experience packet loss probability 1 (e.g., 0.1), while communication link 405-*b* may experience packet loss probability 2 (e.g., 0.2). To achieve a similar network encoding performance for all receiving wireless devices (e.g., receiving wireless device 415-*a* and receiving wireless device 415-*b*), the transmitting wireless device 410-*a* may construct receiver-specific redundancies for corresponding network coding transmissions, as described herein. For example, for k=100 and M=120, a packet loss probability 1 (e.g., 10%) means that about 12 packets or symbols of the 120 packets or symbols may be lost. Thus, the transmitting wireless device 410-*a* may select a redundancy configuration resulting in N=133 for transmissions to receiving wireless device 415-*a* (e.g., 100 original symbols plus 20 to satisfy M=120 plus 13 to address packet loss probability 1 for communication link 405-*a*). Thus, even with path loss 1=0.1, if ten percent of the 120 encoded symbols decoded by the receiving wireless device 315 are lost, the added redundancy of 13 encoded symbols may result in successful reception of the original one or more encoded packets by the receiving wireless device 315-*a*. Similarly, the transmitting wireless device 410-*a* may select a redundancy configuration resulting in N=150 for transmissions to receiving wireless device 415-*b* (e.g., 100 original symbols plus 20 to satisfy M=120 plus 30 to address packet loss probability 2 for 220 communication link 405-*b*).

Returning to FIG. 2, a sidelink channel 220-*a* may have different channel conditions than a direct link 210-*a*. For example, the direct link 210-*a* may experience a packet loss probability of 1, while the sidelink 220-*a* may experience a packet loss probability of 2, as described with reference to FIG. 3. Accordingly, the receiving UE 115-*b* may provide feedback indicating an efficiency of the network coding for the sidelink channel, as described in greater detail with reference to FIG. 5.

For example, a receiving UE 115-*b* may estimate a packet loss probability for the sidelink 220-*a*. For instance, receiving UE 115-*b* may calculate, or otherwise determine, a packet loss probability (e.g., $P_{loss}$) as a packet delivery rate over a certain period of time (e.g., T). The receiving UE 115-*b* may estimate a packet loss probability as a number of received packets divided by a total number of packets transmitted during time $$T\left(P_{loss} = \frac{\text{Number of Received Packets}}{\text{Total number of Transmitted Packets}}\right).$$

A redundancy for the transmission may then be calculated as redundancy $$R = \frac{M}{1 - P_{loss}} - k.$$

In some examples, me receiving UE 115-b may transmit a packet loss probability report (e.g., including an indication of $P_{loss}$) to the base station 105-a, and the base station 105-a may select (e.g., calculate) a redundancy configuration (e.g., a value for R) and transmit the updated redundancy configuration to the transmitting UE 115-a and the receiving UE 115-b. In some examples, the receiving UE 115-b may calculate the redundancy configuration (e.g., value for R), and may transmit an indication of a requested redundancy configuration to the base station 105-a. In some examples, the redundancy may be calculated through a lookup table (LUT), which may map a given packet loss probability $P_{loss}$ to a redundancy value R. In some examples, the base station may transmit the lookup table to the receiving UE 115-b, for example in a configuration message or via RRC. The receiving UE 115-b may map the calculated $P_{loss}$ to the corresponding R and transmit an indication (e.g., an index corresponding to the LUT) of the corresponding R to the base station 105-a. In some examples, the receiving UE 115-b may transmit an indication of a calculated $P_{loss}$ and the base station may map the indicated $P_{loss}$ to a corresponding R via the LUT.

In some examples, the base station 105-a may determine updated network coding parameters for the sidelink channel 210-a (e.g., an updated redundancy configuration R) based on feedback received from the receiving UE 115-b. For example, the receiving UE 115-b may indicate to the base station whether a network coded packet received via the sidelink channel 220-a was decoded successfully or unsuccessfully. If the feedback information indicates that the receiving UE 115-b successfully decoded an original one or more packets network encoded according to $R_0$ (e.g., an original network coding redundancy parameter), then the base station 105-a may indicate to the transmitting UE 115-a and the receiving UE 115-b to continue to use $R_0$ for future network encoding and transmitting for that sidelink channel 220-a. In some examples, if the feedback information indicates that the receiving UE 115-b successfully recovers an original one or more packets network encoded according to $R_0$, then the base station 105-a may decrease $R_0$ by a step size (e.g., D), and the base station 105-a may indicate to the transmitting UE 115-a and the receiving UE 115-b to network and encode a next one or more packets using redundancy $R_0-D$). In some examples, the receiving UE 115-b may request that the base station 105-a decrease $R_0$ by a step size (e.g., D) in response to successfully decoding an original one or more packets network encoded according to $R_0$.

In some examples, if the base station 105-a receives feedback information indicating that the receiving UE 115-b did not successfully recover the one or more network encoded packets, then the base station 105-a may increase $R_0$ by a step size A. The base station 105-a may increment the redundancy parameter, and indicate to the transmitting UE 115-a and the receiving UE 115-b to network encode a next one or more packets using redundancy $R_0+A$. In some examples, the receiving UE 115-b may request that the base station 105-a increase $R_0$ by a step size (e.g., A) in response to successfully decoding an original one or more packets network encoded according to $R_0$.

Figure 5:
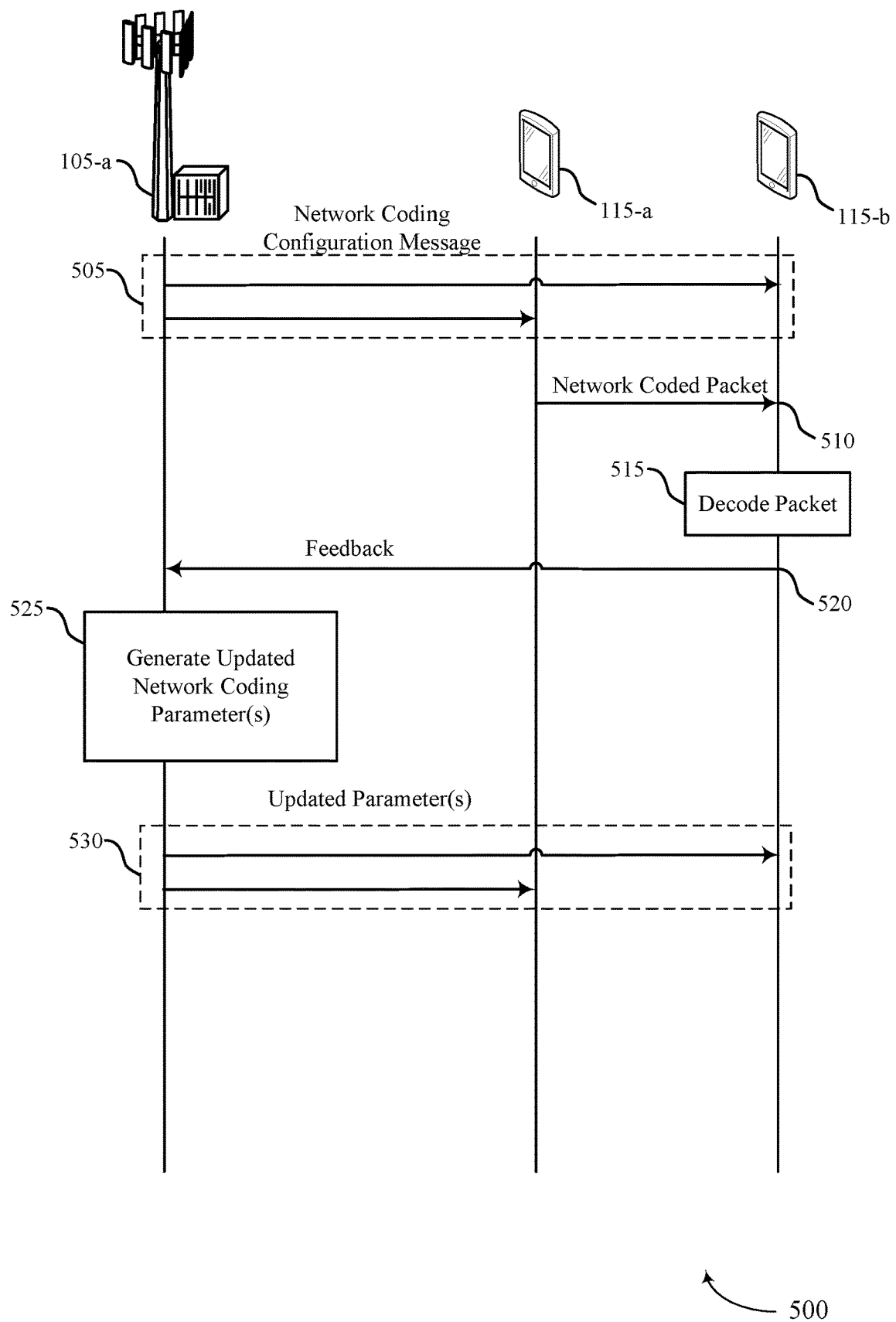
FIG. 5 illustrates an example of a process flow that supports adaptive network coding for sidelink communications in accordance with aspects of the present disclosure.

FIG. 5 illustrates an example of a process flow 500 that supports adaptive network coding for sidelink communications in accordance with aspects of the present disclosure. Process flow 500 may implement aspects of or may be implemented by aspects of wireless communications systems 100 or 200. For example, wireless device base station 105-a may be an example of a base station 105 as described herein, and UEs 115-a and 116-b may be examples a UE 115 as described herein.

At 505, the base station 105-a may transmit one or more parameters associated with a network coding configuration for sidelink communications between the UEs 115-a and 115-b. In some examples, the base station 105-a may transmit the network coding configuration message to the UEs 115-a and 115-b via a MAC-CE signal or via a DCI signal. In some examples, the one or more parameters may be configured by an RRC configuration. In some examples, the one or more parameters may include a network coding redundancy, a number of a set of packets, an encoding algorithm, a decoding algorithm, and/or a resource allocation for the sidelink channel (e.g., the base station 105-a may allocate a specific grant corresponding to an initial redundancy parameter to the transmitting UE 115-a).

At 510, the receiving UE 115-b may receive, from the transmitting UE 115-a via a sidelink channel, a packet encoded based on the one or more parameters associated with the network coding configuration for the sidelink channel received from the base station 105-a.

At 515, the receiving UE 115-b may decode the packet based on the one or more parameters associated with the network coding configuration for the sidelink channel received from the base station 105-a.

At 520, the receiving UE 115-b may transmit, to the base station 105-a, a message including information that indicates an efficiency of the network coding configuration for the sidelink channel based on the decoding of the packet. In some examples, the receiving UE 115-b may transmit the information that indicates an efficiency of the network coding configuration for the sidelink channel via a MAC-CE signal or via a UCI signal (e.g., on the direct link). In some examples, the receiving UE 115-b may also or alternatively transmit the message comprising information that indicates an efficiency of the network coding configuration for the sidelink channel to the transmitting UE 115-a.

In some examples, prior to transmitting the feedback message at 520, the receiving UE 115-b may estimate the loss probability for the packet received from the transmitting UE 115-a. In some examples, the information that indicates an efficiency of the network coding configuration for the sidelink channel may include the estimated loss probability. In some examples, the receiving UE 115-b may estimate the loss probability based on a number of packets received by the receiving UE 115-b during a time period and a total number of packets transmitted by the transmitting UE 115-a during the time period. In some examples, the receiving UE 115-b may estimate the loss probability based on a number of symbols received by the receiving UE 115-b during a time period and a total number of symbols transmitted by the transmitting UE 115-a during the time period. In some examples, the receiving UE 115-b may generate a redundancy parameter for the network coding configuration for the sidelink based on the estimated loss probability, and the information that indicates an efficiency of the network coding configuration for the sidelink channel may include the generated redundancy parameter. For examples, the redundancy parameter R may be calculated as $$R = \frac{M}{1 - P_{loss}} - k.$$

In some examples, the receiving UE 115-b may generate the redundancy parameter via a LUT, which may be transmitted to the receiving UE 115-b from the base station 105-a via a configuration message, e.g., in the configuration message sent in 505 or in an RRC configuration.

In some examples, the receiving UE 115-b may include in the information that indicates an efficiency of the network coding configuration a request to increase or decrease the redundancy parameter for the network coding configuration for the sidelink (e.g., by a specific amount) based on whether the receiving UE 115-b unsuccessfully or successfully decoded the packet from the transmitting UE 115-a, respectively. In some examples, the UE 115-b may request to increase or decrease the redundancy parameter by an amount configured or specified by an RRC configuration.

In some examples, prior to transmitting the information that indicates an efficiency of the network coding configuration for the sidelink channel, the receiving UE 115-b may receive, from the base station 105-a, a request to transmit the information that indicates the efficiency of the network coding configuration for the sidelink channel. In some examples, the request to transmit the information that indicates the efficiency of the network coding configuration for the sidelink channel may be based on a condition of the sidelink channel or a quality of service target associated with the sidelink channel. In some examples, prior to transmitting the information that indicates an efficiency of the network coding configuration for the sidelink channel, the receiving UE 115-b may transmit, to the base station 105-a, a request to transmit the information that indicates the efficiency of the network coding configuration for the sidelink channel. The receiving UE 115-b may transmit the request based on, for example, a condition of the sidelink channel or a quality of service target associated with the sidelink channel. In response, the base station 105-a may transmit, to the receiving UE 115-b, a grant based on, for example, a condition of the sidelink channel or a quality of service target associated with the sidelink channel.

At 525, the base station 105-a may generate one or more updated parameters associated with the network coding configuration for the sidelink, which may be different from the one or more parameters transmitted at 505. For example, if the base station 105-a receives, at 520, an estimated loss probability for the sidelink channel, the base station 105-a may generate an updated redundancy parameter R based on the estimated loss probability (e.g., based on $$R = \frac{M}{1 - P_{loss}} - k$$

or based on a LUT). In some examples, the receiving UE 115-b may transmit a redundancy parameter to the base station 105-a at 520, and the base station 105-a may generate the one or more updated parameters associated with the network coding configuration for the sidelink based on the received redundancy parameter.

In some examples, the base station 105-a may receive, from the receiving UE 115-b at 520, a request to increase or decrease the redundancy parameter for the network coding configuration for the sidelink channel, and the base station 105-a may generate the one or more updated parameters associated with the network coding configuration for the sidelink based on the request to increase or decrease the redundancy parameter.

At 530, the base station 105-a may transmit the one or more updated parameters associated with the network coding configuration for the sidelink to the transmitting UE 115-a and the receiving UE 115-b, for example via a MAC-CE signal or via a DCI signal. The transmitting UE 115-a may encode future packets based on the one or more updated parameters associated with the network coding configuration for the sidelink, and the receiving UE 115-b may decode future packets received from the transmitting UE 115-a based on the one or more updated parameters associated with the network coding configuration for the sidelink for example, until receiving additional updated network coding parameters from the base station 105-a.

Figure 6:
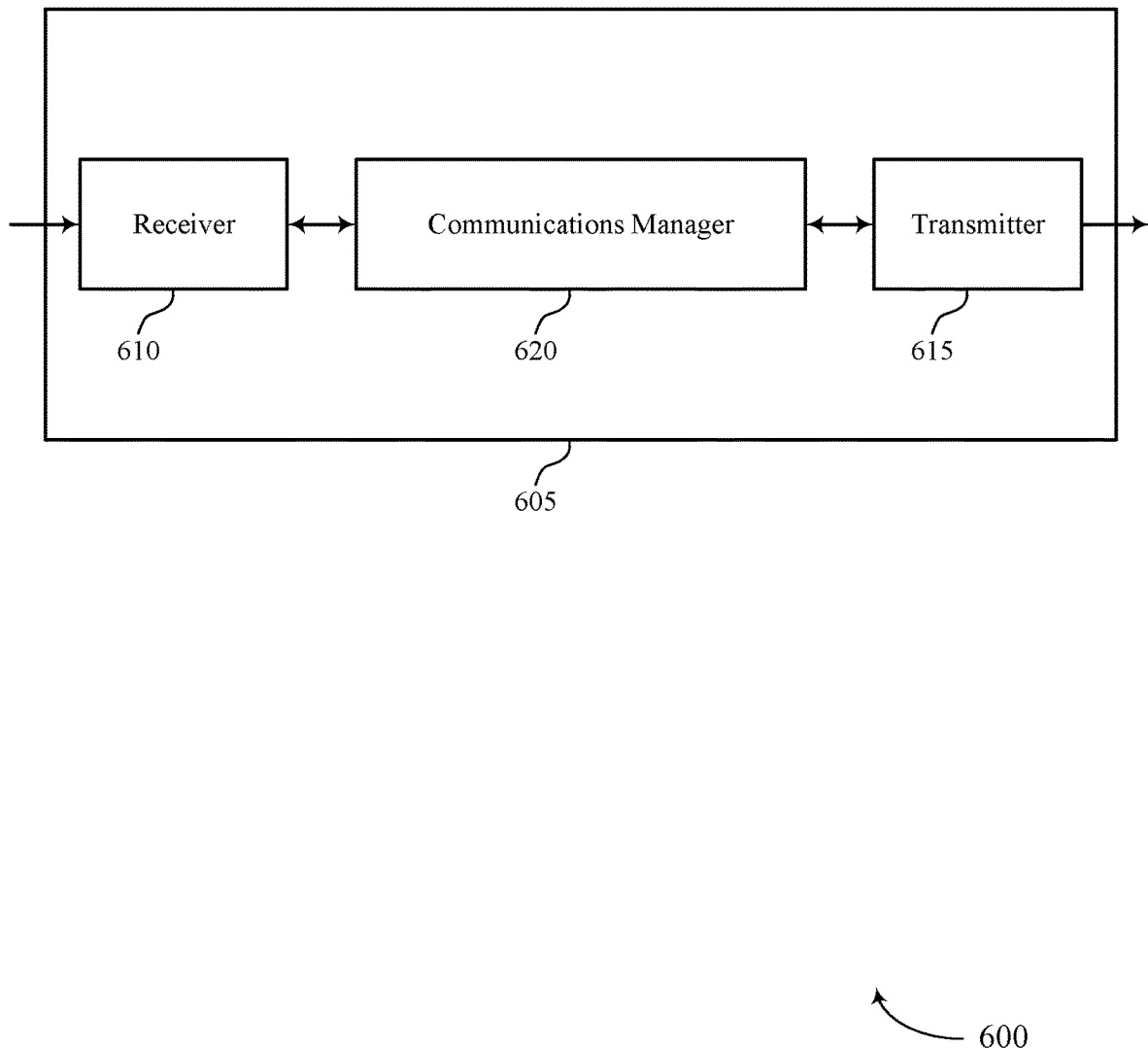
FIGS. 6 and 7 show block diagrams of devices that support adaptive network coding for sidelink communications in accordance with aspects of the present disclosure.

FIG. 6 shows a block diagram 600 of a device 605 that supports adaptive network coding for sidelink communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to adaptive network coding for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to adaptive network coding for sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of adaptive network coding for sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for receiving, from a base station, one or more network coding parameters associated with a network coding configuration for sidelink communications for the first UE. The communications manager 620 may be configured as or otherwise support a means for receiving, from a second UE via a sidelink channel, a packet encoded according to the network coding configuration. The communications manager 620 may be configured as or otherwise support a means for decoding the packet based on the one or more network coding parameters received from the base station. The communications manager 620 may be configured as or otherwise support a means for transmitting a message including information that indicates an efficiency of the network coding configuration for the sidelink channel based on the decoding of the packet.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources, which may results in more efficient encoding and decoding of packets.

Figure 7:
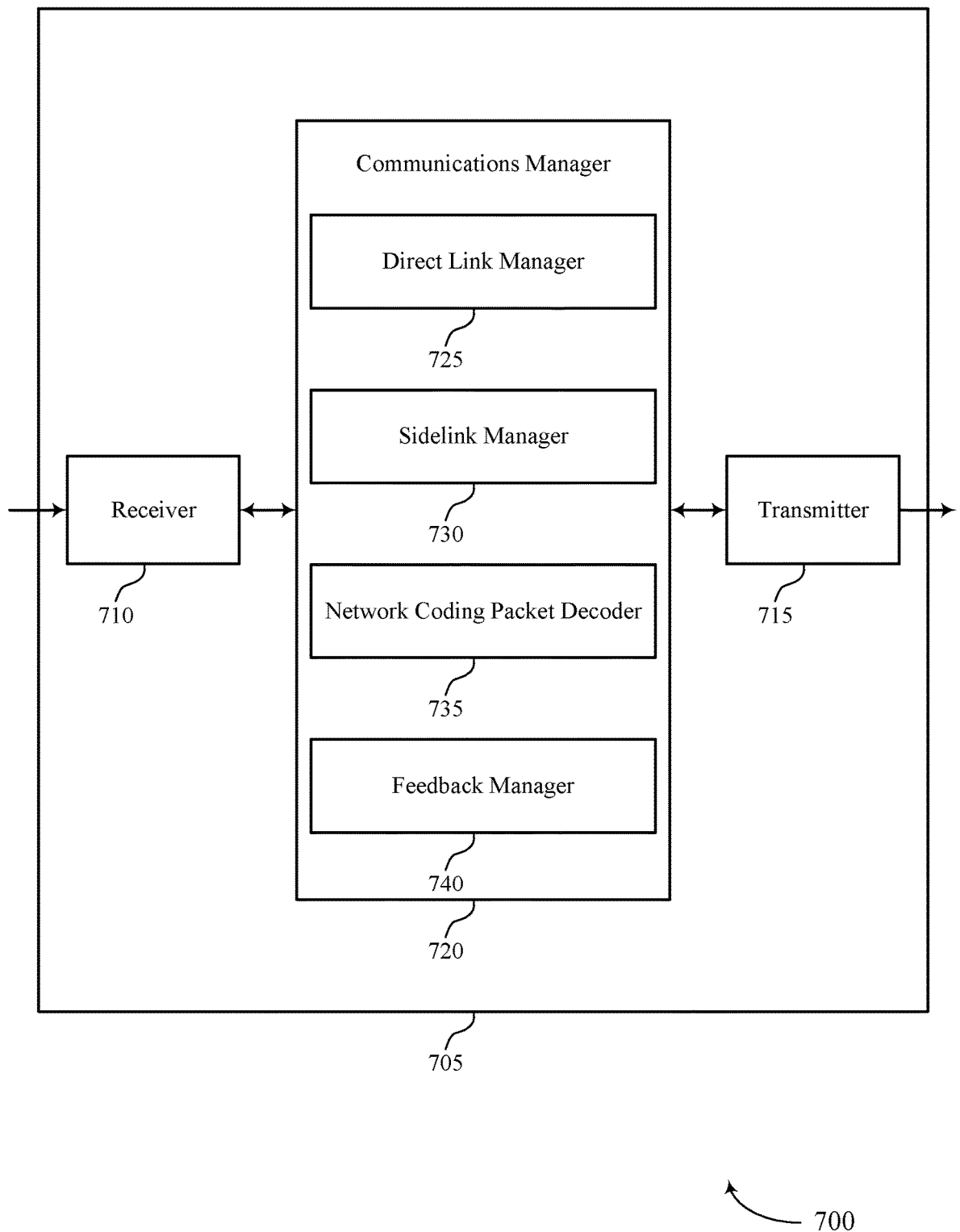

FIG. 7 shows a block diagram 700 of a device 705 that supports adaptive network coding for sidelink communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to adaptive network coding for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to adaptive network coding for sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of adaptive network coding for sidelink communications as described herein. For example, the communications manager 720 may include a direct link manager 725, a sidelink manager 730, a network coding packet decoder 735, a feedback manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The direct link manager 725 may be configured as or otherwise support a means for receiving, from a base station, one or more network coding parameters associated with a network coding configuration for sidelink communications for the first UE. The sidelink manager 730 may be configured as or otherwise support a means for receiving, from a second UE via a sidelink channel, a packet encoded according to the network coding configuration. The network coding packet decoder 735 may be configured as or otherwise support a means for decoding the packet based on the one or more network coding parameters received from the base station. The feedback manager 740 may be configured as or otherwise support a means for transmitting a message including information that indicates an efficiency of the network coding configuration for the sidelink channel based on the decoding of the packet.

Figure 8:
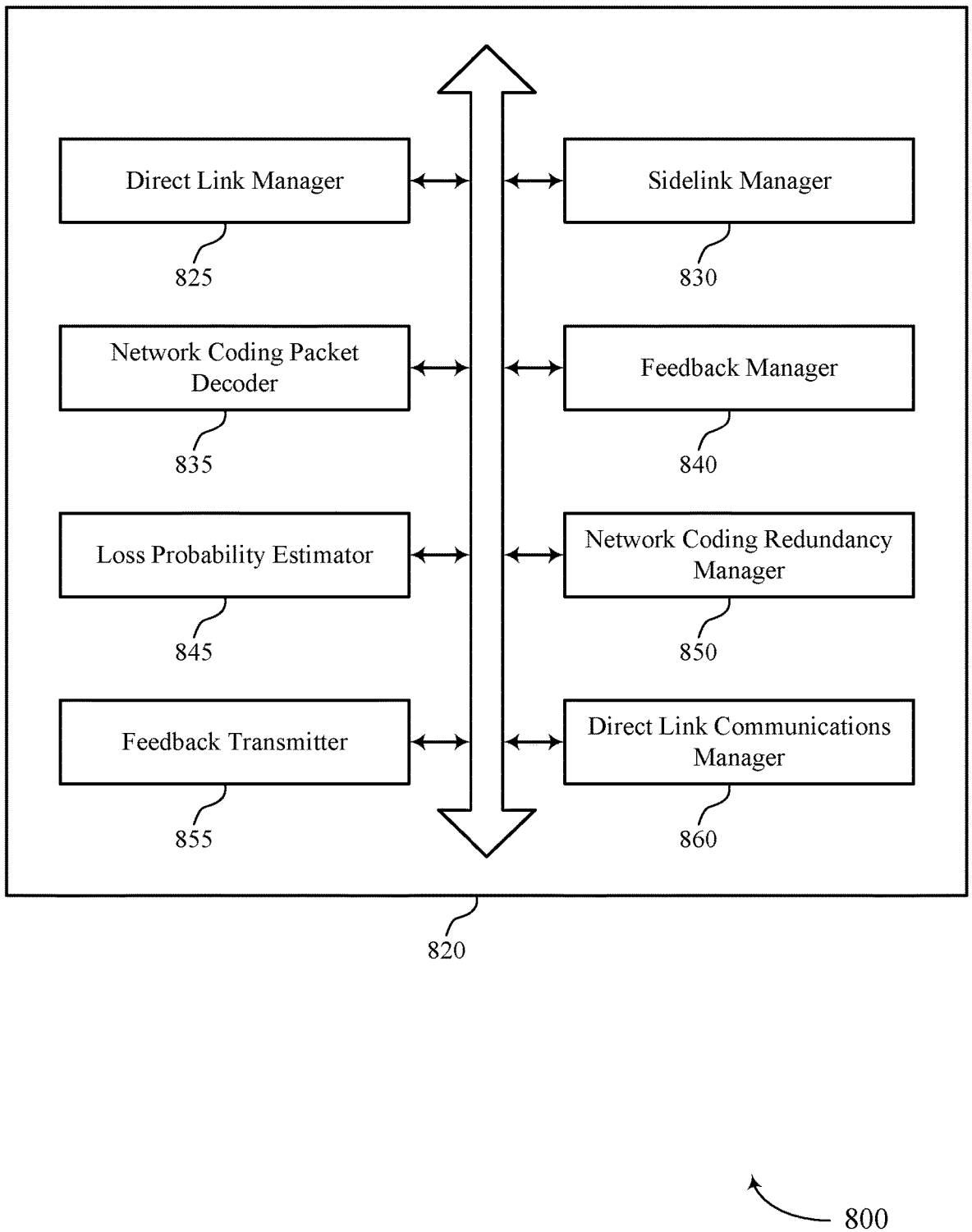
FIG. 8 shows a block diagram of a communications manager that supports adaptive network coding for sidelink communications in accordance with aspects of the present disclosure.

FIG. 8 shows a block diagram 800 of a communications manager 820 that supports adaptive network coding for sidelink communications in accordance with aspects of the present disclosure. The communications manager 820 may be an example of aspects of a communications manager 620, a communications manager 720, or both, as described herein. The communications manager 820, or various components thereof, may be an example of means for performing various aspects of adaptive network coding for sidelink communications as described herein. For example, the communications manager 820 may include a direct link manager 825, a sidelink manager 830, a network coding packet decoder 835, a feedback manager 840, a loss probability estimator 845, a network coding redundancy manager 850, a feedback transmitter 855, a direct link communications manager 860, or any combination thereof. Each of these components may communicate, directly or indirectly, with one another (e.g., via one or more buses).

The communications manager 820 may support wireless communication at a first UE in accordance with examples as disclosed herein. The direct link manager 825 may be configured as or otherwise support a means for receiving, from a base station, one or more network coding parameters associated with a network coding configuration for sidelink communications for the first UE. The sidelink manager 830 may be configured as or otherwise support a means for receiving, from a second UE via a sidelink channel, a packet encoded according to the network coding configuration. The network coding packet decoder 835 may be configured as or otherwise support a means for decoding the packet based on the one or more network coding parameters received from the base station. The feedback manager 840 may be configured as or otherwise support a means for transmitting a message including information that indicates an efficiency of the network coding configuration for the sidelink channel based on the decoding of the packet.

In some examples, the loss probability estimator 845 may be configured as or otherwise support a means for estimating a loss probability for the packet, where the information that indicates the efficiency of the network coding configuration for the sidelink channel includes the estimated loss probability.

In some examples, to support estimating the loss probability, the loss probability estimator 845 may be configured as or otherwise support a means for estimating the loss probability based on a number of packets received by the first UE during a time period and a total number of packets transmitted by the second UE during the time period.

In some examples, the loss probability estimator 845 may be configured as or otherwise support a means for estimating a loss probability for the packet. In some examples, the network coding redundancy manager 850 may be configured as or otherwise support a means for generating a redundancy parameter based on the estimated loss probability, where the information that indicates the efficiency of the network coding configuration for the sidelink channel includes the redundancy parameter.

In some examples, the direct link communications manager 860 may be configured as or otherwise support a means for receiving, via a control message, an indication of a lookup table for the UE, where the redundancy parameter is generated at least in part on the lookup table.

In some examples, the feedback transmitter 855 may be configured as or otherwise support a means for transmitting, as part of the information that indicates the efficiency of the network coding configuration for the sidelink channel, a request to increase a redundancy parameter of the network coding configuration based on determining that the decoding of the packet was unsuccessful.

In some examples, the feedback manager 840 may be configured as or otherwise support a means for transmitting, as part of the information that indicates the efficiency of the network coding configuration for the sidelink channel, a request to decrease a redundancy parameter of the network coding configuration based on determining that the decoding of the packet was successful.

In some examples, to support receiving the one or more network coding parameters, the direct link manager 825 may be configured as or otherwise support a means for receiving the one or more network coding parameters associated with the network coding configuration for the first UE via a MAC-CE signal or via a DCI signal.

In some examples, to support transmitting the message including the information that indicates the efficiency of the network coding configuration for the sidelink channel, the feedback manager 840 may be configured as or otherwise support a means for transmitting the message via a MAC-CE signal or via a UCI signal.

In some examples, the one or more network coding parameters include at least one of a coding redundancy, a number of a set of packets including the packet, an encoding algorithm, a decoding algorithm, a resource allocation for the sidelink channel, or any combination thereof.

In some examples, the direct link manager 825 may be configured as or otherwise support a means for receiving, from the base station, a request to transmit the information that indicates the efficiency of the network coding configuration for the sidelink channel, where the information is transmitted based on the request.

In some examples, the feedback manager 840 may be configured as or otherwise support a means for transmitting, to the base station, a request to transmit the information that indicates the efficiency of the network coding configuration for the sidelink channel. In some examples, the direct link manager 825 may be configured as or otherwise support a means for receiving from the base station, a grant in response to the request, where the information is transmitted based on the grant.

In some examples, the request to transmit the information that indicates the efficiency of the network coding configuration for the sidelink channel is based on one of a condition of the sidelink channel or a quality of service target associated with the sidelink channel.

In some examples, the direct link manager 825 may be configured as or otherwise support a means for receiving, from the base station, one or more updated network coding parameters associated with the network coding configuration for the UE, where the one or more updated network coding parameters are different from the one or more network coding parameters. In some examples, the sidelink manager 830 may be configured as or otherwise support a means for receiving, from the second UE via the sidelink channel, a second packet encoded according to the network coding configuration. In some examples, the network coding packet decoder 835 may be configured as or otherwise support a means for decoding the second packet based on the one or more updated network coding parameters.

In some examples, the message including the information that indicates the efficiency of the network coding configuration for the sidelink channel is transmitted to at least one of the base station or the second UE.

Figure 9:
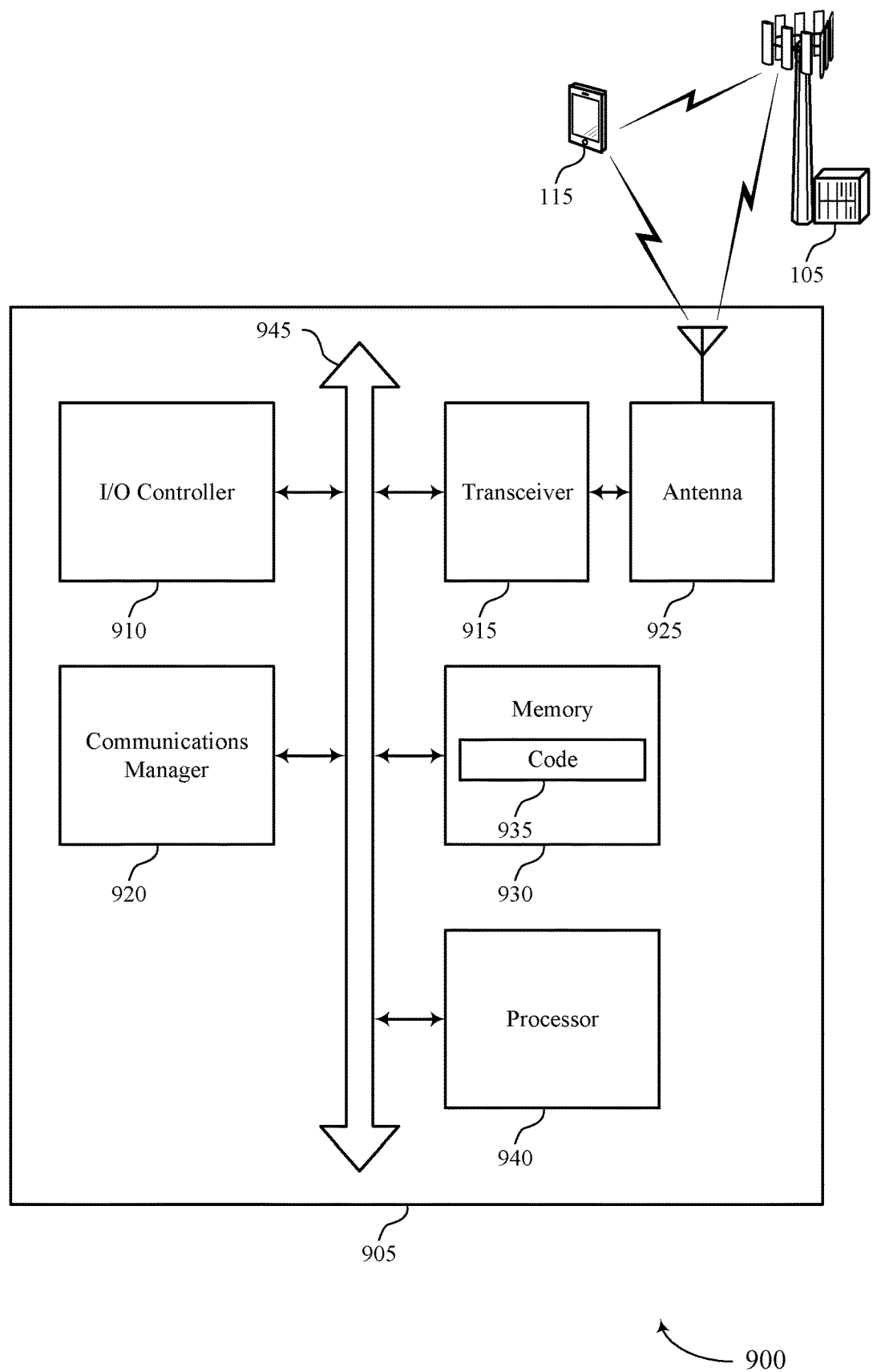
FIG. 9 shows a diagram of a system including a device that supports adaptive network coding for sidelink communications in accordance with aspects of the present disclosure.

FIG. 9 shows a diagram of a system 900 including a device 905 that supports adaptive network coding for sidelink communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting adaptive network coding for sidelink communications). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving, from a base station, one or more network coding parameters associated with a network coding configuration for sidelink communications for the first UE. The communications manager 920 may be configured as or otherwise support a means for receiving, from a second UE via a sidelink channel, a packet encoded according to the network coding configuration. The communications manager 920 may be configured as or otherwise support a means for decoding the packet based on the one or more network coding parameters received from the base station. The communications manager 920 may be configured as or otherwise support a means for transmitting a message including information that indicates an efficiency of the network coding configuration for the sidelink channel based on the decoding of the packet.

By including or configuring the communications manager 920 in accordance with examples as described herein, the device 905 may support techniques for improved communication reliability and more efficient utilization of communication resources, for example by reducing packet loss and reducing excess redundancy.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of adaptive network coding for sidelink communications as described herein, or the processor 940 and the memory 930 may be otherwise configured to perform or support such operations.

Figure 10:
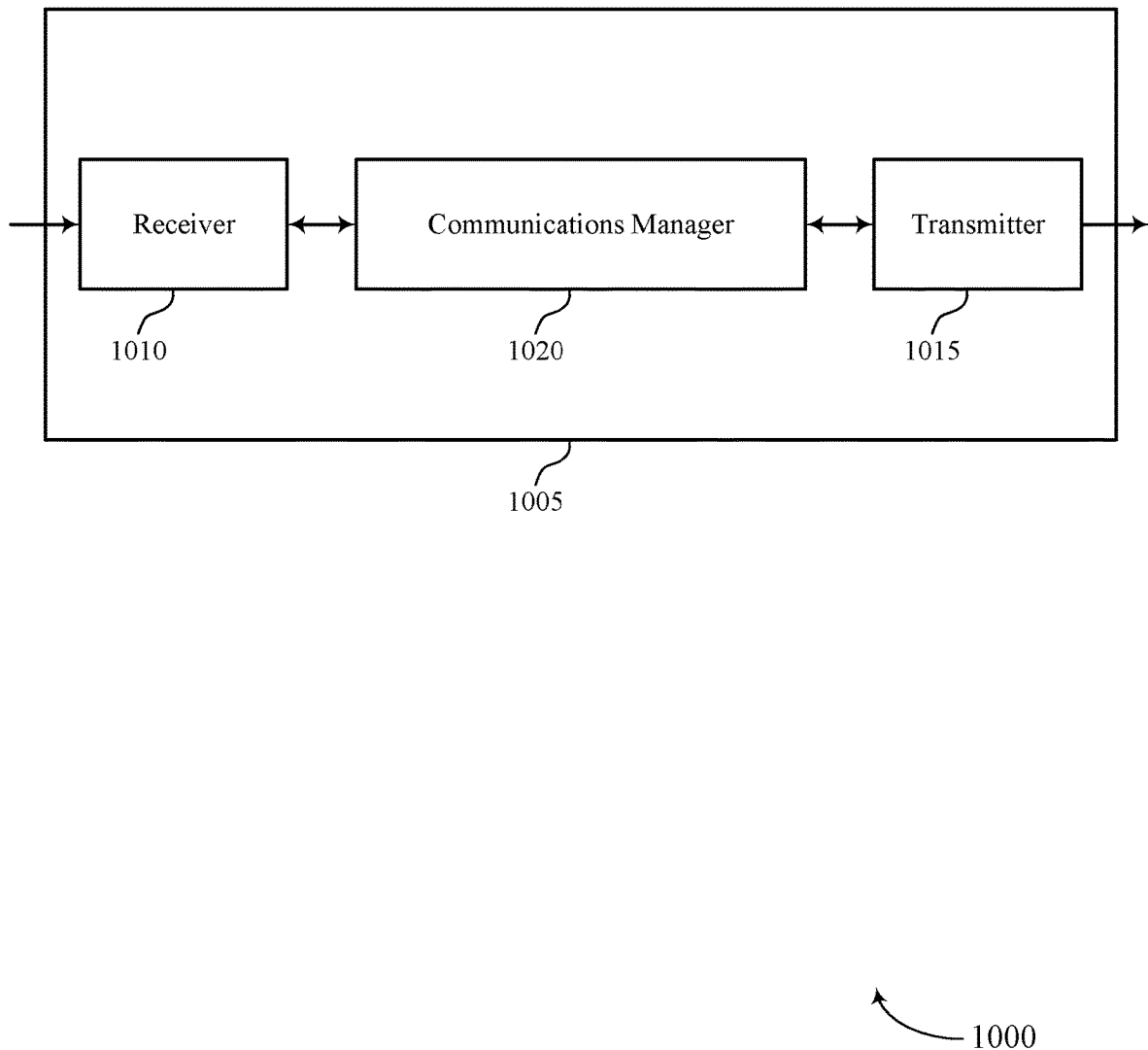
FIGS. 10 and 11 show block diagrams of devices that support adaptive network coding for sidelink communications in accordance with aspects of the present disclosure.

FIG. 10 shows a block diagram 1000 of a device 1005 that supports adaptive network coding for sidelink communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to adaptive network coding for sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to adaptive network coding for sidelink communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of adaptive network coding for sidelink communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to one or more UEs, one or more first network coding parameters associated with a network coding configuration for sidelink communications for the one or more UEs. The communications manager 1020 may be configured as or otherwise support a means for receiving, from a first UE of the one or more UEs, a message including information that indicates an efficiency of the network coding configuration for a packet transmitted via a sidelink channel from a second UE to the first UE. The communications manager 1020 may be configured as or otherwise support a means for transmitting, to the second UE, one or more second network coding parameters associated with the network coding configuration based on the information that indicates the efficiency of the network coding configuration, where the one or more second network coding parameters are different from the one or more first network coding parameters.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for may support techniques for more efficient utilization of communication resources, which may results in more efficient encoding and decoding of packets.

Figure 11:
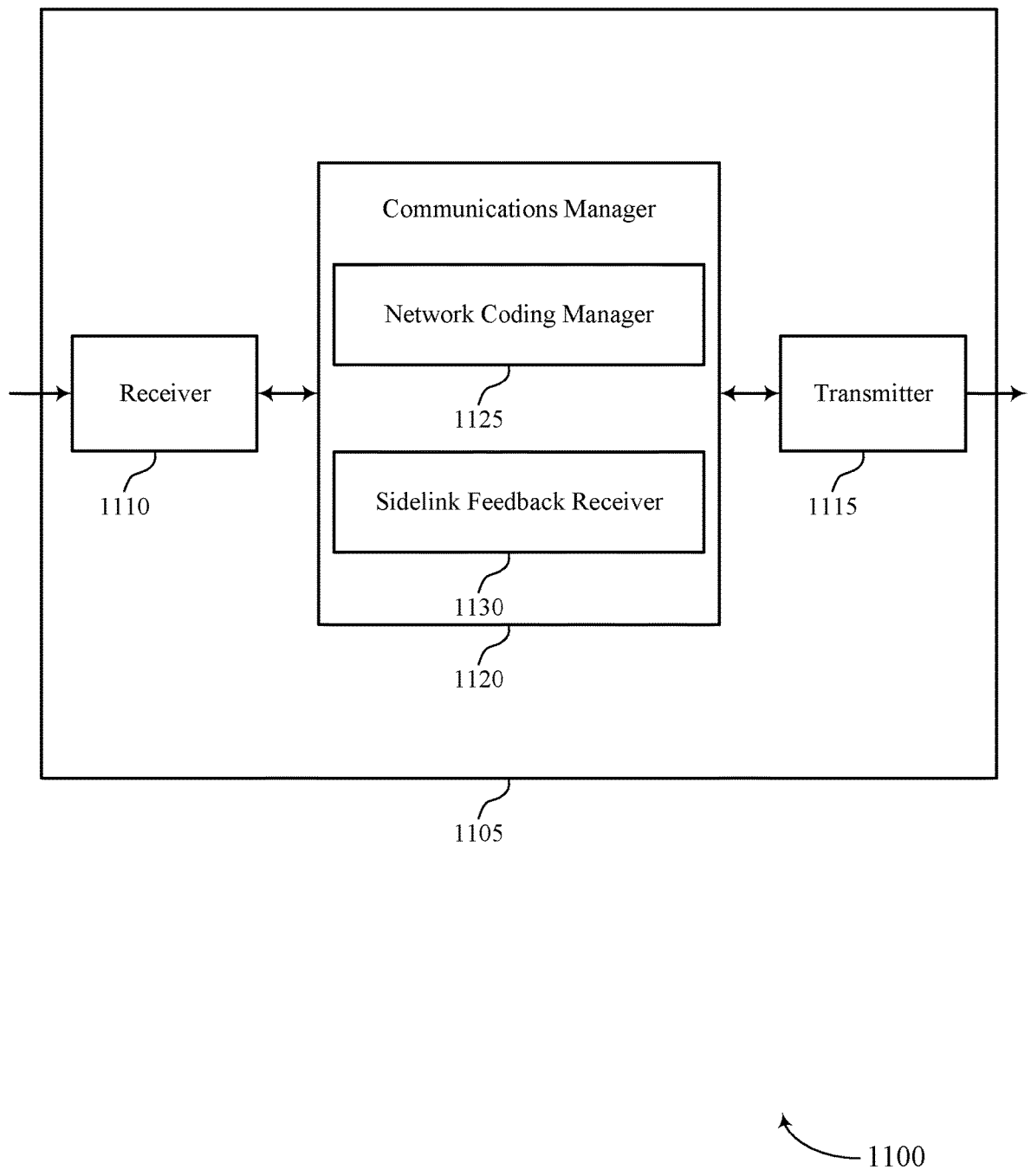

FIG. 11 shows a block diagram 1100 of a device 1105 that supports adaptive network coding for sidelink communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to adaptive network coding for sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to adaptive network coding for sidelink communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of adaptive network coding for sidelink communications as described herein. For example, the communications manager 1120 may include a network coding manager 1125 a sidelink feedback receiver 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The network coding manager 1125 may be configured as or otherwise support a means for transmitting, to one or more UEs, one or more first network coding parameters associated with a network coding configuration for sidelink communications for the one or more UEs. The sidelink feedback receiver 1130 may be configured as or otherwise support a means for receiving, from a first UE of the one or more UEs, a message including information that indicates an efficiency of the network coding configuration for a packet transmitted via a sidelink channel from a second UE to the first UE. The network coding manager 1125 may be configured as or otherwise support a means for transmitting, to the second UE, one or more second network coding parameters associated with the network coding configuration based on the information that indicates the efficiency of the network coding configuration, where the one or more second network coding parameters are different from the one or more first network coding parameters.

Figure 12:
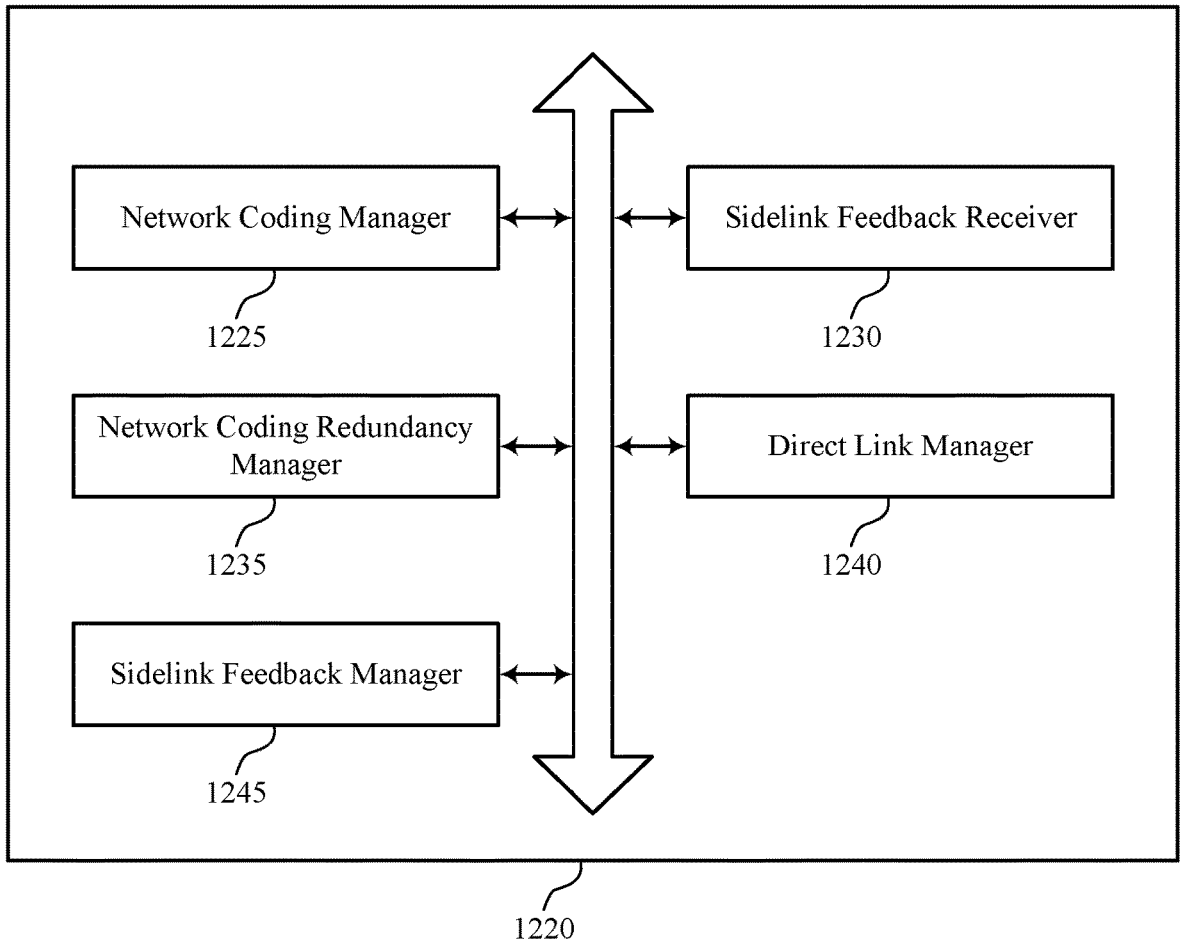
FIG. 12 shows a block diagram of a communications manager that supports adaptive network coding for sidelink communications in accordance with aspects of the present disclosure.

FIG. 12 shows a block diagram 1200 of a communications manager 1220 that supports adaptive network coding for sidelink communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of adaptive network coding for sidelink communications as described herein. For example, the communications manager 1220 may include a network coding manager 1225, a sidelink feedback receiver 1230, a network coding redundancy manager 1235, a direct link manager 1240, a sidelink feedback manager 1245, or any combination thereof. Each of these components may communicate, directly or indirectly, with one another (e.g., via one or more buses).

The communications manager 1220 may support wireless communication at a base station in accordance with examples as disclosed herein. The network coding manager 1225 may be configured as or otherwise support a means for transmitting, to one or more UEs, one or more first network coding parameters associated with a network coding configuration for sidelink communications for the one or more UEs. The sidelink feedback receiver 1230 may be configured as or otherwise support a means for receiving, from a first UE of the one or more UEs, a message including information that indicates an efficiency of the network coding configuration for a packet transmitted via a sidelink channel from a second UE to the first UE. In some examples, the network coding manager 1225 may be configured as or otherwise support a means for transmitting, to the second UE, one or more second network coding parameters associated with the network coding configuration based on the information that indicates the efficiency of the network coding configuration, where the one or more second network coding parameters are different from the one or more first network coding parameters.

In some examples, the sidelink feedback receiver 1230 may be configured as or otherwise support a means for receiving, in the message, an estimated loss probability for the sidelink channel. In some examples, the network coding redundancy manager 1235 may be configured as or otherwise support a means for generating a redundancy parameter based on the estimated loss probability, where the one or more second network coding parameters are based on the redundancy parameter.

In some examples, the sidelink feedback receiver 1230 may be configured as or otherwise support a means for receiving, in the message, a redundancy parameter. In some examples, the network coding manager 1225 may be configured as or otherwise support a means for where the one or more second network coding parameters are based on the redundancy parameter.

In some examples, the network coding manager 1225 may be configured as or otherwise support a means for transmitting, via a control message, an indication of a lookup table for the first UE, where the redundancy parameter is based on the lookup table.

In some examples, to support receiving the information that indicates the efficiency of the network coding configuration, the sidelink feedback receiver 1230 may be configured as or otherwise support a means for receiving a request to decrease a redundancy parameter of the network coding configuration, where the one or more second network coding parameters includes a decreased redundancy parameter.

In some examples, to support receiving the information that indicates the efficiency of the network coding configuration, the sidelink feedback receiver 1230 may be configured as or otherwise support a means for receiving a request to increase a redundancy parameter of the network coding configuration, where the one or more second network coding parameters includes an increased redundancy parameter.

In some examples, to support transmitting the one or more first network coding parameters associated with the network coding configuration, the direct link manager 1240 may be configured as or otherwise support a means for transmitting the one or more first network coding parameters associated with the network coding configuration via a MAC-CE signal or via a DCI signal.

In some examples, the information that indicates the efficiency of the network coding configuration is received via a MAC-CE signal or via a UCI signal.

In some examples, the one or more first network coding parameters include at least one of a coding redundancy, a number of subpackets per packet, an encoding algorithm, a decoding algorithm, or a resource allocation for the sidelink channel.

In some examples, the sidelink feedback manager 1245 may be configured as or otherwise support a means for transmitting, to the first UE, a request to transmit the information that indicates the efficiency of the network coding configuration for the sidelink channel.

In some examples, where the request to transmit the information that indicates the efficiency of the network coding configuration for the sidelink channel is based on one of a condition of the sidelink channel or a quality of service target associated with the sidelink channel.

In some examples, the sidelink feedback manager 1245 may be configured as or otherwise support a means for receiving, from the first UE, a request to transmit the information that indicates the efficiency of the network coding configuration for the sidelink channel. In some examples, the sidelink feedback manager 1245 may be configured as or otherwise support a means for transmitting, to the first UE, a grant in response to the request based on one of a condition of the sidelink channel or a quality of service target associated with the sidelink channel.

Figure 13:
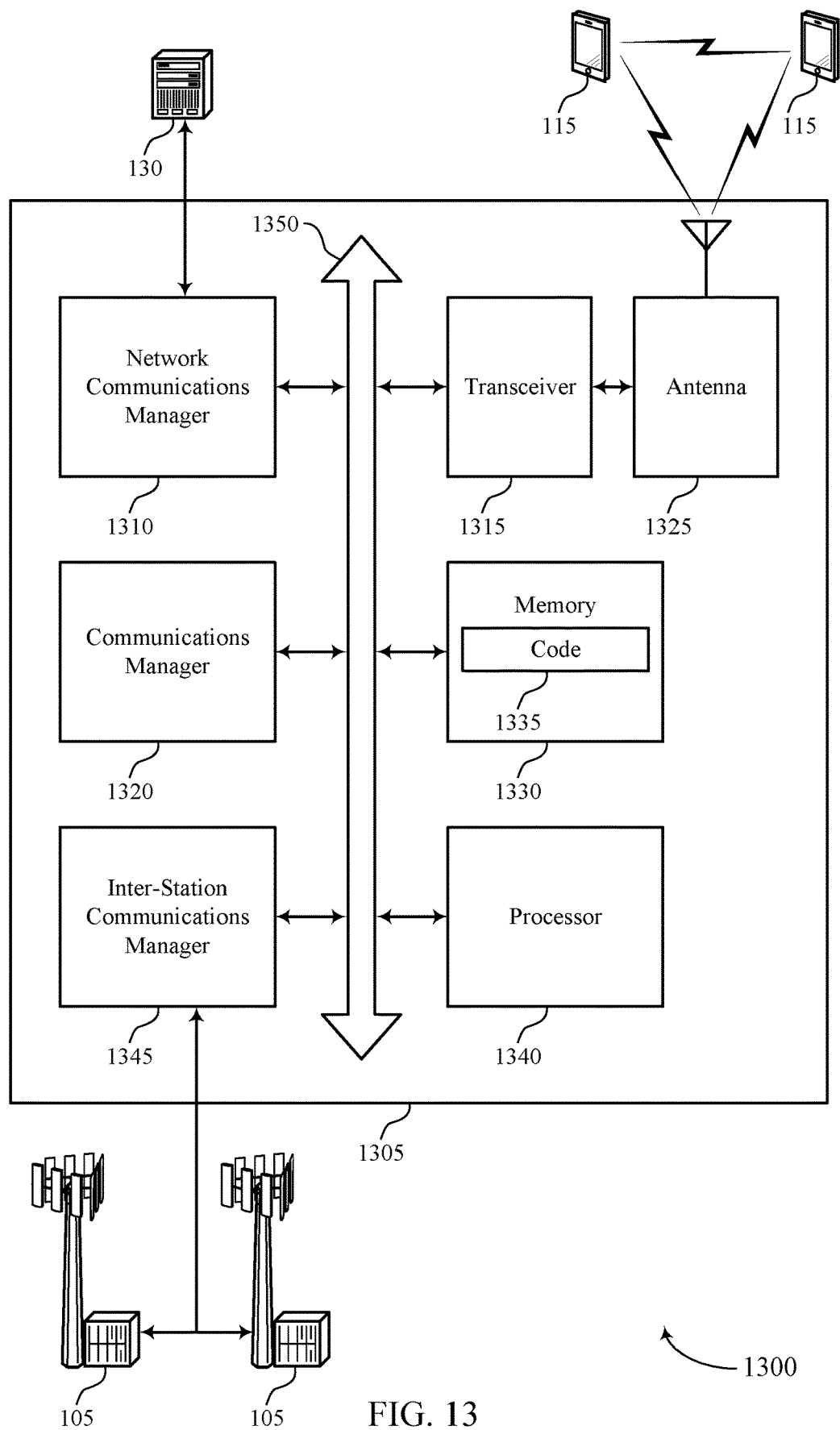
FIG. 13 shows a diagram of a system including a device that supports adaptive network coding for sidelink communications in accordance with aspects of the present disclosure.

FIG. 13 shows a diagram of a system 1300 including a device 1305 that supports adaptive network coding for sidelink communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting adaptive network coding for sidelink communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to one or more UEs, one or more first network coding parameters associated with a network coding configuration for sidelink communications for the one or more UEs. The communications manager 1320 may be configured as or otherwise support a means for receiving, from a first UE of the one or more UEs, a message including information that indicates an efficiency of the network coding configuration for a packet transmitted via a sidelink channel from a second UE to the first UE. The communications manager 1320 may be configured as or otherwise support a means for transmitting, to the second UE, one or more second network coding parameters associated with the network coding configuration based on the information that indicates the efficiency of the network coding configuration, where the one or more second network coding parameters are different from the one or more first network coding parameters.

By including or configuring the communications manager 1320 in accordance with examples as described herein, the device 1305 may support techniques for improved communication reliability and more efficient utilization of communication resources, for example by reducing packet loss and reducing excess redundancy.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of adaptive network coding for sidelink communications as described herein, or the processor 1340 and the memory 1330 may be otherwise configured to perform or support such operations.

Figure 14:
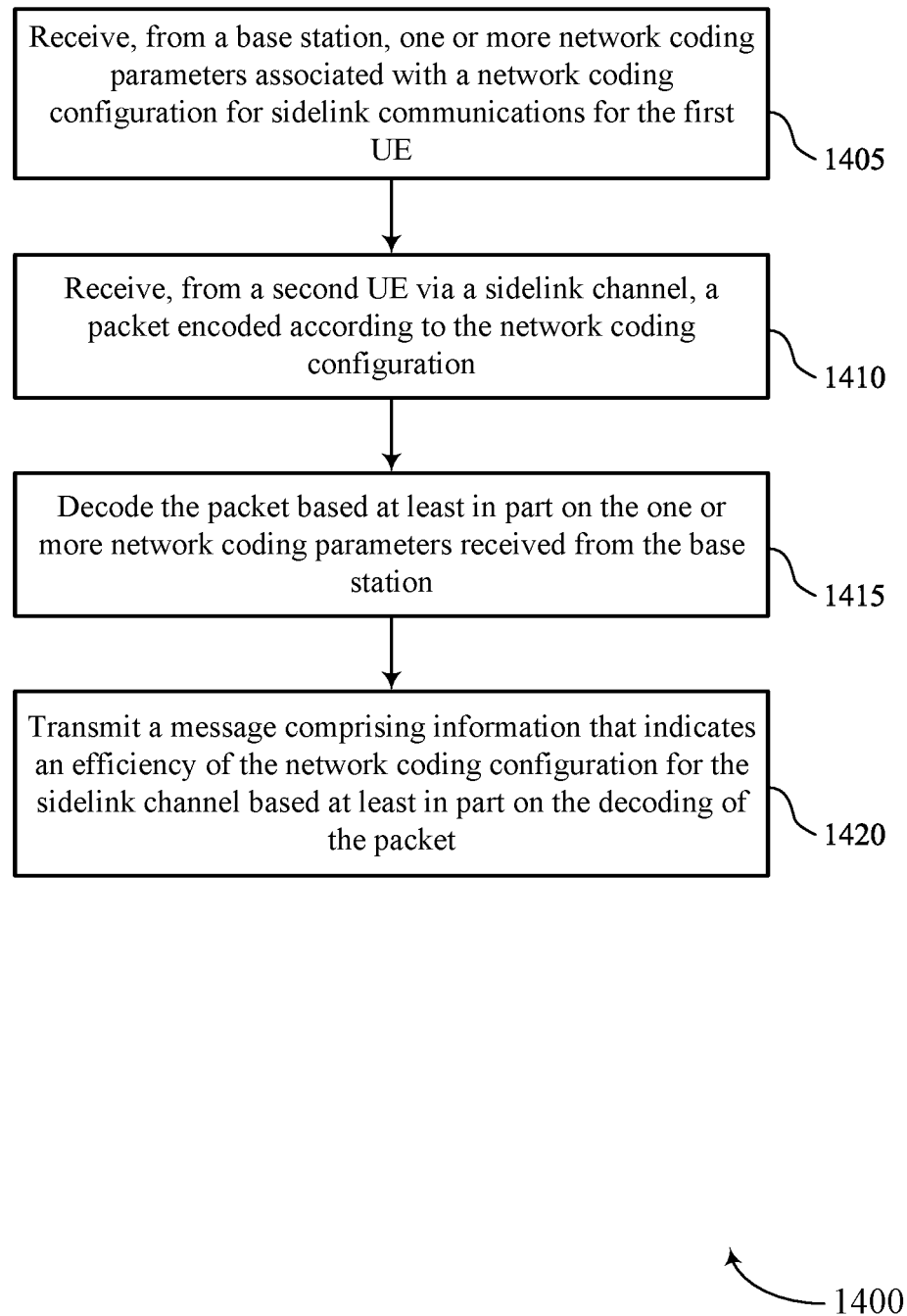
FIGS. 14 through 21 show flowcharts illustrating methods that support adaptive network coding for sidelink communications in accordance with aspects of the present disclosure.

FIG. 14 shows a flowchart illustrating a method 1400 that supports adaptive network coding for sidelink communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more network coding parameters associated with a network coding configuration for sidelink communications for the first UE. The operations of 1405 may be performed in accordance with examples as disclosed herein. In some examples, aspects of the operations of 1405 may be performed by a direct link manager 825 as described with reference to FIG. 8.

At 1410, the method may include receiving, from a second UE via a sidelink channel, a packet encoded according to the network coding configuration. The operations of 1410 may be performed in accordance with examples as disclosed herein. In some examples, aspects of the operations of 1410 may be performed by a sidelink manager 830 as described with reference to FIG. 8.

At 1415, the method may include decoding the packet based on the one or more network coding parameters received from the base station. The operations of 1415 may be performed in accordance with examples as disclosed herein. In some examples, aspects of the operations of 1415 may be performed by a network coding packet decoder 835 as described with reference to FIG. 8.

At 1420, the method may include transmitting a message including information that indicates an efficiency of the network coding configuration for the sidelink channel based on the decoding of the packet. The operations of 1420 may be performed in accordance with examples as disclosed herein. In some examples, aspects of the operations of 1420 may be performed by a feedback manager 840 as described with reference to FIG. 8.

Figure 15:
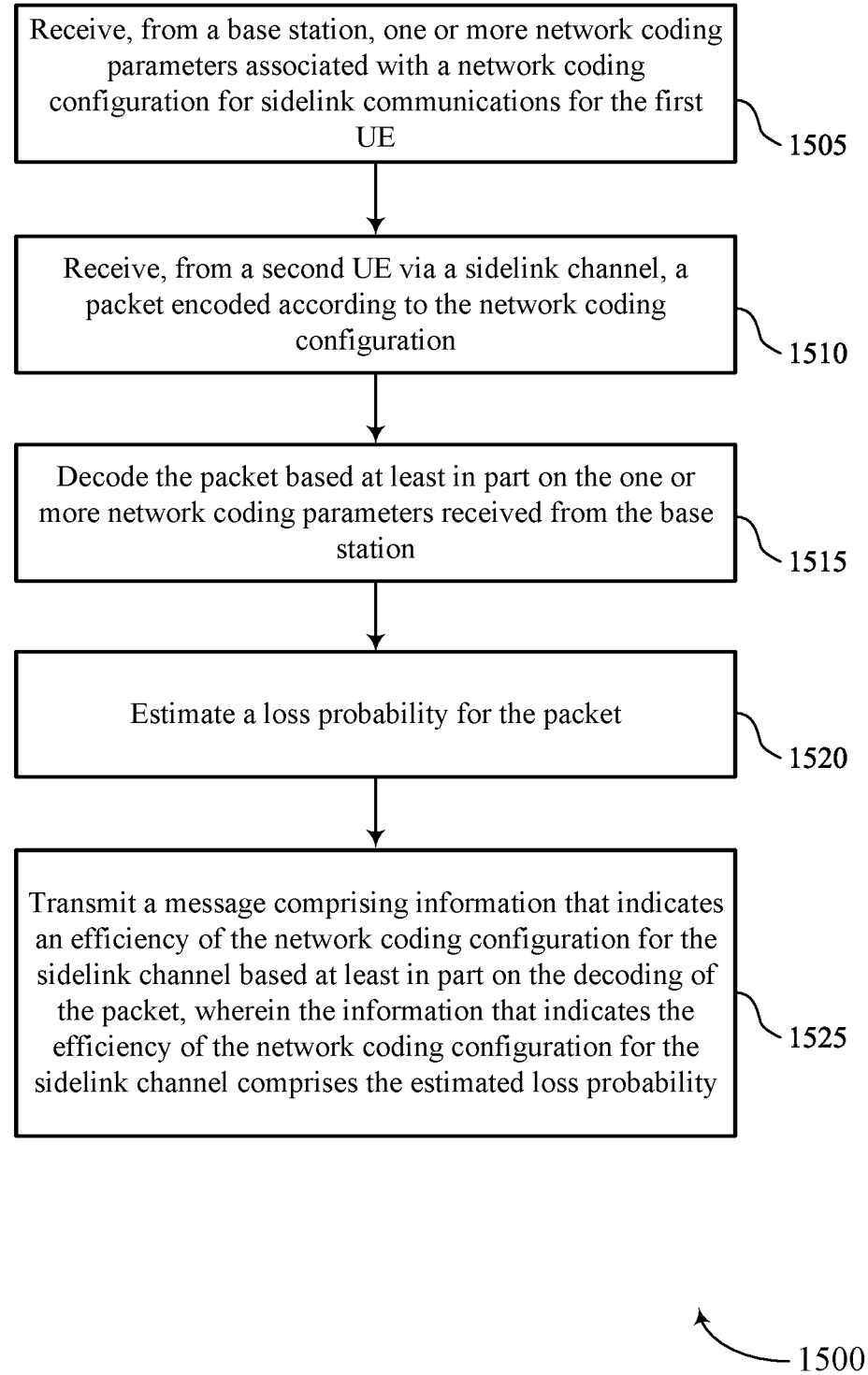

FIG. 15 shows a flowchart illustrating a method 1500 that supports adaptive network coding for sidelink communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, one or more network coding parameters associated with a network coding configuration for sidelink communications for the first UE. The operations of 1505 may be performed in accordance with examples as disclosed herein. In some examples, aspects of the operations of 1505 may be performed by a direct link manager 825 as described with reference to FIG. 8.

At 1510, the method may include receiving, from a second UE via a sidelink channel, a packet encoded according to the network coding configuration. The operations of 1510 may be performed in accordance with examples as disclosed herein. In some examples, aspects of the operations of 1510 may be performed by a sidelink manager 830 as described with reference to FIG. 8.

At 1515, the method may include decoding the packet based on the one or more network coding parameters received from the base station. The operations of 1515 may be performed in accordance with examples as disclosed herein. In some examples, aspects of the operations of 1515 may be performed by a network coding packet decoder 835 as described with reference to FIG. 8.

At 1520, the method may include estimating a loss probability for the packet. The operations of 1520 may be performed in accordance with examples as disclosed herein. In some examples, aspects of the operations of 1520 may be performed by a loss probability estimator 845 as described with reference to FIG. 8.

At 1525, the method may include transmitting a message including information that indicates an efficiency of the network coding configuration for the sidelink channel based on the decoding of the packet, where the information that indicates the efficiency of the network coding configuration for the sidelink channel includes the estimated loss probability. The operations of 1525 may be performed in accordance with examples as disclosed herein. In some examples, aspects of the operations of 1525 may be performed by a feedback manager 840 as described with reference to FIG. 8.

Figure 16:
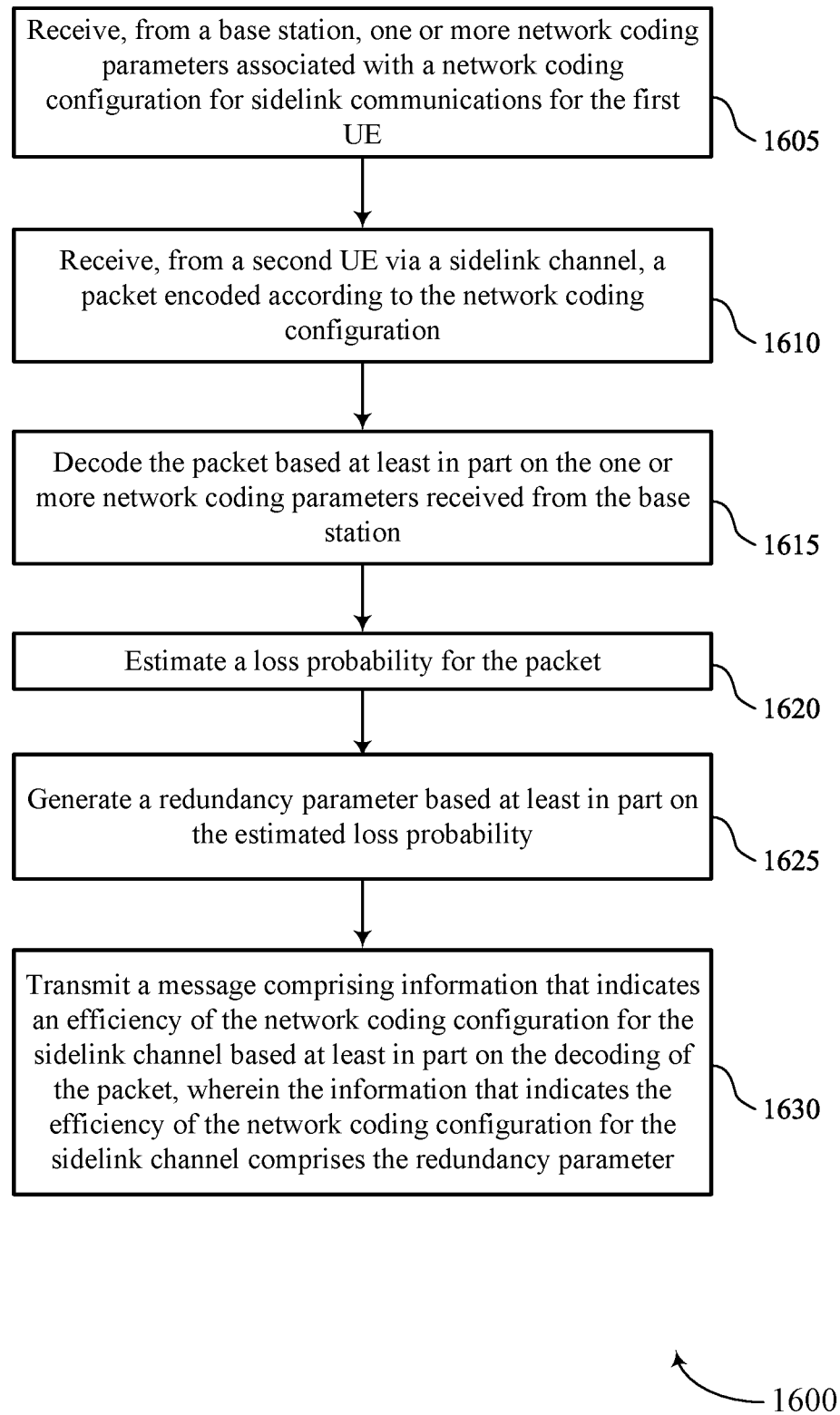

FIG. 16 shows a flowchart illustrating a method 1600 that supports adaptive network coding for sidelink communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, one or more network coding parameters associated with a network coding configuration for sidelink communications for the first UE. The operations of 1605 may be performed in accordance with examples as disclosed herein. In some examples, aspects of the operations of 1605 may be performed by a direct link manager 825 as described with reference to FIG. 8.

At 1610, the method may include receiving, from a second UE via a sidelink channel, a packet encoded according to the network coding configuration. The operations of 1610 may be performed in accordance with examples as disclosed herein. In some examples, aspects of the operations of 1610 may be performed by a sidelink manager 830 as described with reference to FIG. 8.

At 1615, the method may include decoding the packet based on the one or more network coding parameters received from the base station. The operations of 1615 may be performed in accordance with examples as disclosed herein. In some examples, aspects of the operations of 1615 may be performed by a network coding packet decoder 835 as described with reference to FIG. 8.

At 1620, the method may include estimating a loss probability for the packet. The operations of 1620 may be performed in accordance with examples as disclosed herein. In some examples, aspects of the operations of 1620 may be performed by a loss probability estimator 845 as described with reference to FIG. 8.

At 1625, the method may include generating a redundancy parameter based on the estimated loss probability. The operations of 1625 may be performed in accordance with examples as disclosed herein. In some examples, aspects of the operations of 1625 may be performed by a network coding redundancy manager 850 as described with reference to FIG. 8.

At 1630, the method may include transmitting a message including information that indicates an efficiency of the network coding configuration for the sidelink channel based on the decoding of the packet, where the information that indicates the efficiency of the network coding configuration for the sidelink channel includes the redundancy parameter. The operations of 1630 may be performed in accordance with examples as disclosed herein. In some examples, aspects of the operations of 1630 may be performed by a feedback manager 840 as described with reference to FIG. 8.

Figure 17:
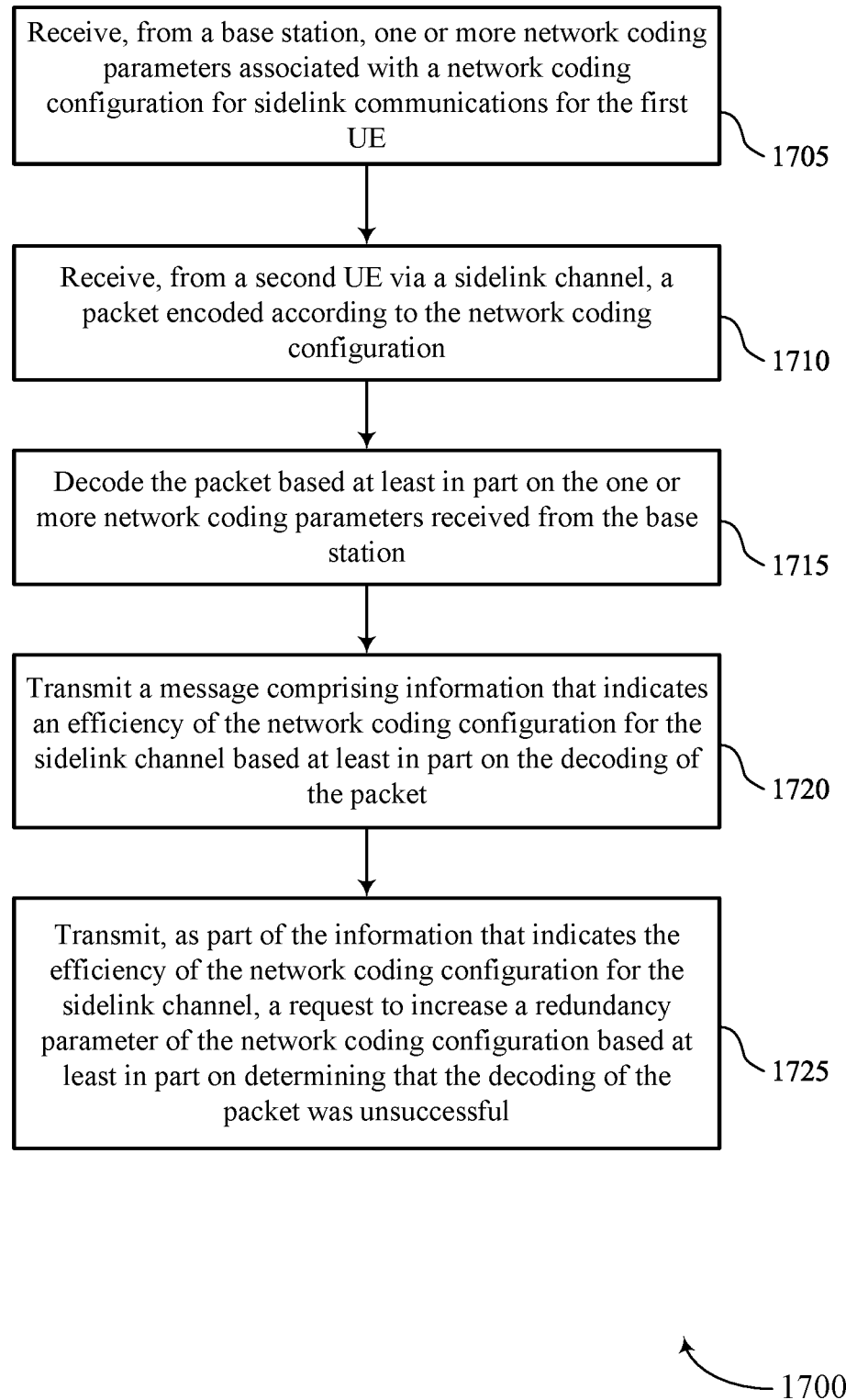

FIG. 17 shows a flowchart illustrating a method 1700 that supports adaptive network coding for sidelink communications in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, one or more network coding parameters associated with a network coding configuration for sidelink communications for the first UE. The operations of 1705 may be performed in accordance with examples as disclosed herein. In some examples, aspects of the operations of 1705 may be performed by a direct link manager 825 as described with reference to FIG. 8.

At 1710, the method may include receiving, from a second UE via a sidelink channel, a packet encoded according to the network coding configuration. The operations of 1710 may be performed in accordance with examples as disclosed herein. In some examples, aspects of the operations of 1710 may be performed by a sidelink manager 830 as described with reference to FIG. 8.

At 1715, the method may include decoding the packet based on the one or more network coding parameters received from the base station. The operations of 1715 may be performed in accordance with examples as disclosed herein. In some examples, aspects of the operations of 1715 may be performed by a network coding packet decoder 835 as described with reference to FIG. 8.

At 1720, the method may include transmitting a message including information that indicates an efficiency of the network coding configuration for the sidelink channel based on the decoding of the packet. The operations of 1720 may be performed in accordance with examples as disclosed herein. In some examples, aspects of the operations of 1720 may be performed by a feedback manager 840 as described with reference to FIG. 8.

At 1725, the method may include transmitting, as part of the information that indicates the efficiency of the network coding configuration for the sidelink channel, a request to increase a redundancy parameter of the network coding configuration based on determining that the decoding of the packet was unsuccessful. The operations of 1725 may be performed in accordance with examples as disclosed herein. In some examples, aspects of the operations of 1725 may be performed by a feedback transmitter 855 as described with reference to FIG. 8.

Figure 18:
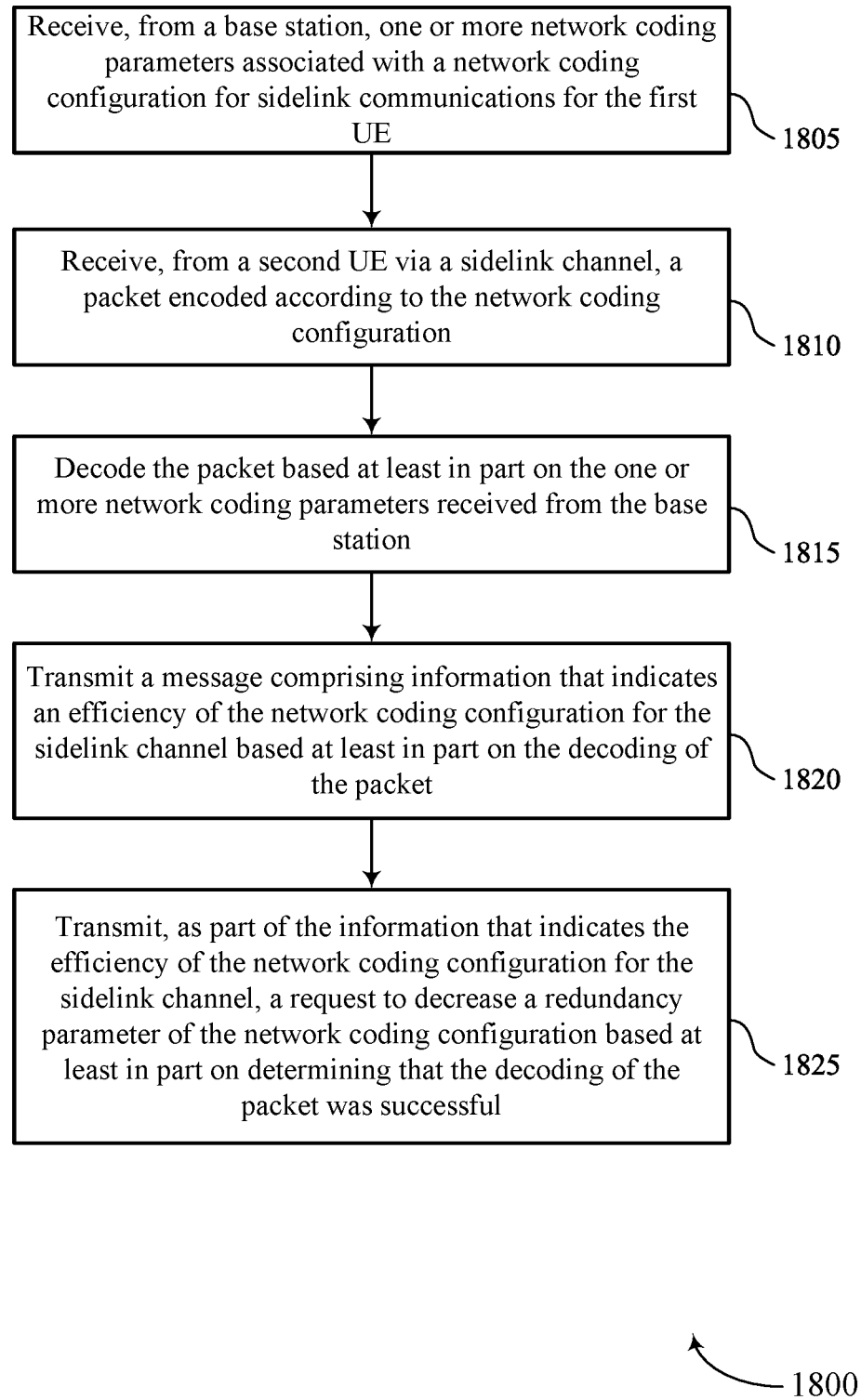

FIG. 18 shows a flowchart illustrating a method 1800 that supports adaptive network coding for sidelink communications in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, one or more network coding parameters associated with a network coding configuration for sidelink communications for the first UE. The operations of 1805 may be performed in accordance with examples as disclosed herein. In some examples, aspects of the operations of 1805 may be performed by a direct link manager 825 as described with reference to FIG. 8.

At 1810, the method may include receiving, from a second UE via a sidelink channel, a packet encoded according to the network coding configuration. The operations of 1810 may be performed in accordance with examples as disclosed herein. In some examples, aspects of the operations of 1810 may be performed by a sidelink manager 830 as described with reference to FIG. 8.

At 1815, the method may include decoding the packet based on the one or more network coding parameters received from the base station. The operations of 1815 may be performed in accordance with examples as disclosed herein. In some examples, aspects of the operations of 1815 may be performed by a network coding packet decoder 835 as described with reference to FIG. 8.

At 1820, the method may include transmitting a message including information that indicates an efficiency of the network coding configuration for the sidelink channel based on the decoding of the packet. The operations of 1820 may be performed in accordance with examples as disclosed herein. In some examples, aspects of the operations of 1820 may be performed by a feedback manager 840 as described with reference to FIG. 8.

At 1825, the method may include transmitting, as part of the information that indicates the efficiency of the network coding configuration for the sidelink channel, a request to decrease a redundancy parameter of the network coding configuration based on determining that the decoding of the packet was successful. The operations of 1825 may be performed in accordance with examples as disclosed herein. In some examples, aspects of the operations of 1825 may be performed by a feedback manager 840 as described with reference to FIG. 8.

Figure 19:
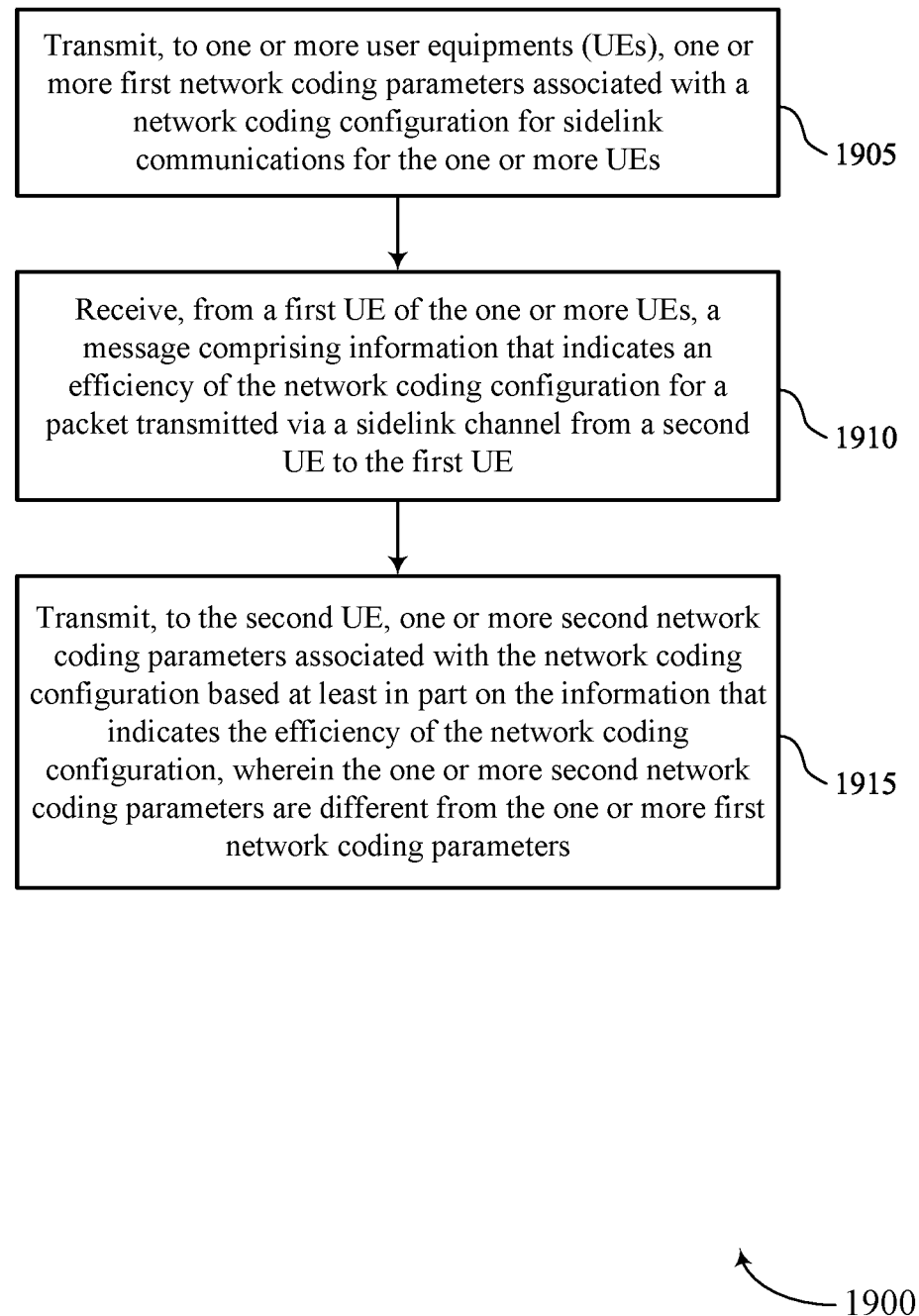

FIG. 19 shows a flowchart illustrating a method 1900 that supports adaptive network coding for sidelink communications in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to one or more UEs, one or more first network coding parameters associated with a network coding configuration for sidelink communications for the one or more UEs. The operations of 1905 may be performed in accordance with examples as disclosed herein. In some examples, aspects of the operations of 1905 may be performed by a network coding manager 1225 as described with reference to FIG. 12.

At 1910, the method may include receiving, from a first UE of the one or more UEs, a message including information that indicates an efficiency of the network coding configuration for a packet transmitted via a sidelink channel from a second UE to the first UE. The operations of 1910 may be performed in accordance with examples as disclosed herein. In some examples, aspects of the operations of 1910 may be performed by a sidelink feedback receiver 1230 as described with reference to FIG. 12.

At 1915, the method may include transmitting, to the second UE, one or more second network coding parameters associated with the network coding configuration based on the information that indicates the efficiency of the network coding configuration, where the one or more second network coding parameters are different from the one or more first network coding parameters. The operations of 1915 may be performed in accordance with examples as disclosed herein. In some examples, aspects of the operations of 1915 may be performed by a network coding manager 1225 as described with reference to FIG. 12.

Figure 20:
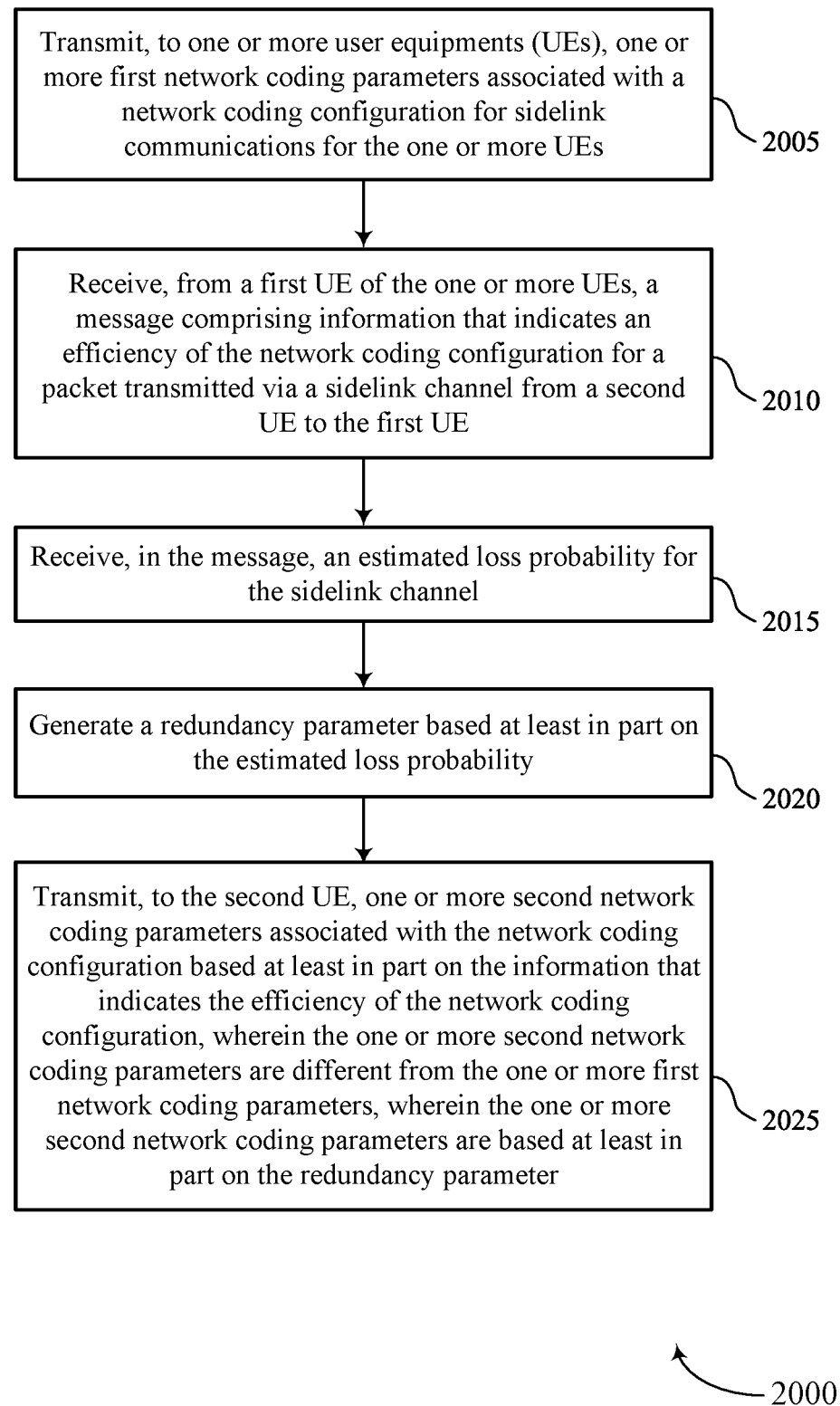

FIG. 20 shows a flowchart illustrating a method 2000 that supports adaptive network coding for sidelink communications in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to one or more UEs, one or more first network coding parameters associated with a network coding configuration for sidelink communications for the one or more UEs. The operations of 2005 may be performed in accordance with examples as disclosed herein. In some examples, aspects of the operations of 2005 may be performed by a network coding manager 1225 as described with reference to FIG. 12.

At 2010, the method may include receiving, from a first UE of the one or more UEs, a message including information that indicates an efficiency of the network coding configuration for a packet transmitted via a sidelink channel from a second UE to the first UE. The operations of 2010 may be performed in accordance with examples as disclosed herein. In some examples, aspects of the operations of 2010 may be performed by a sidelink feedback receiver 1230 as described with reference to FIG. 12.

At 2015, the method may include receiving, in the message, an estimated loss probability for the sidelink channel. The operations of 2015 may be performed in accordance with examples as disclosed herein. In some examples, aspects of the operations of 2015 may be performed by a sidelink feedback receiver 1230 as described with reference to FIG. 12.

At 2020, the method may include generating a redundancy parameter based on the estimated loss probability. The operations of 2020 may be performed in accordance with examples as disclosed herein. In some examples, aspects of the operations of 2020 may be performed by a network coding redundancy manager 1235 as described with reference to FIG. 12.

At 2025, the method may include transmitting, to the second UE, one or more second network coding parameters associated with the network coding configuration based on the information that indicates the efficiency of the network coding configuration, where the one or more second network coding parameters are different from the one or more first network coding parameters, and where the one or more second network coding parameters are based on the redundancy parameter. The operations of 2025 may be performed in accordance with examples as disclosed herein. In some examples, aspects of the operations of 2025 may be performed by a network coding manager 1225 as described with reference to FIG. 12.

Figure 21:
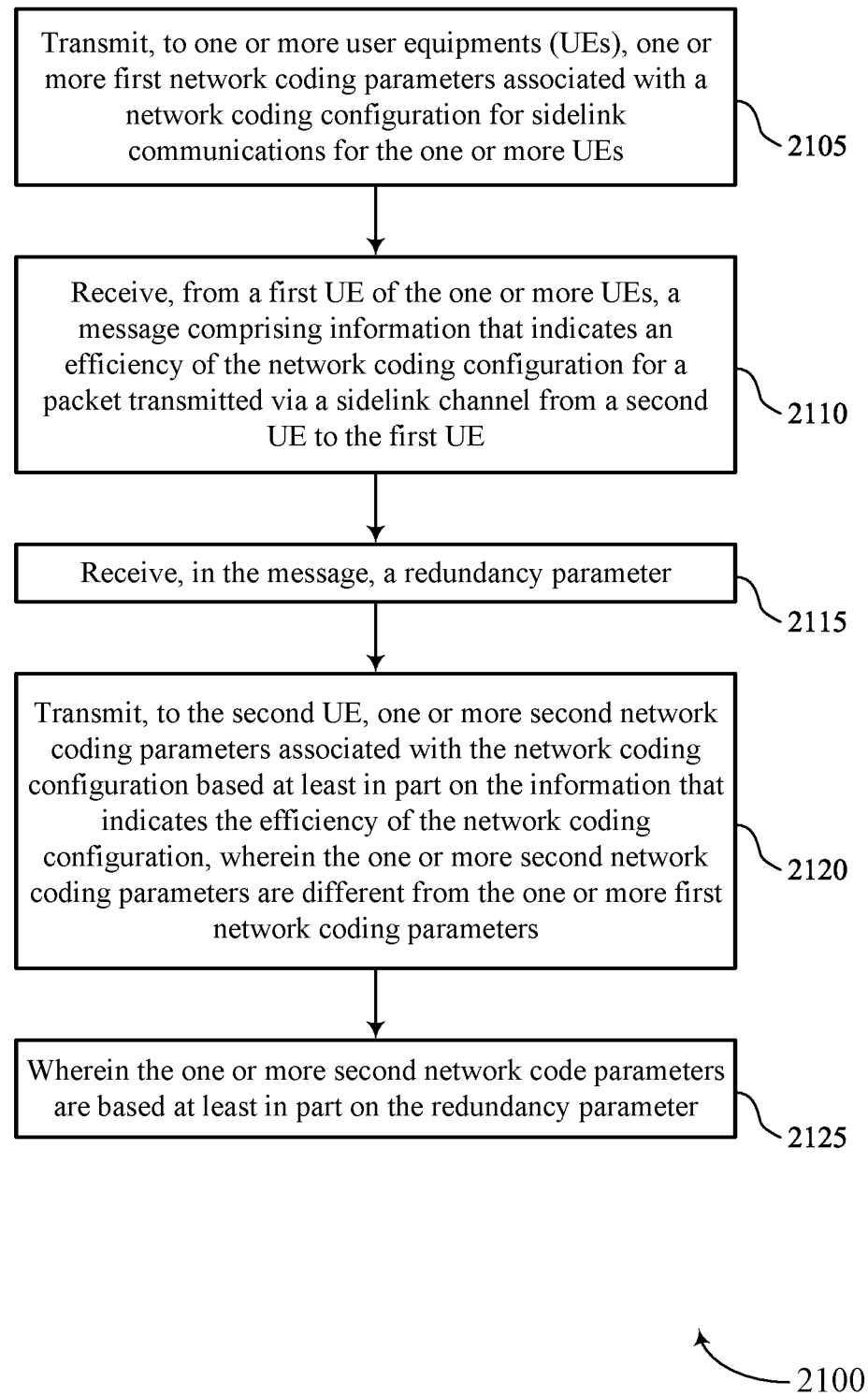

FIG. 21 shows a flowchart illustrating a method 2100 that supports adaptive network coding for sidelink communications in accordance with aspects of the present disclosure. The operations of the method 2100 may be implemented by a base station or its components as described herein. For example, the operations of the method 2100 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2105, the method may include transmitting, to one or more UEs, one or more first network coding parameters associated with a network coding configuration for sidelink communications for the one or more UEs. The operations of 2105 may be performed in accordance with examples as disclosed herein. In some examples, aspects of the operations of 2105 may be performed by a network coding manager 1225 as described with reference to FIG. 12.

At 2110, the method may include receiving, from a first UE of the one or more UEs, a message including information that indicates an efficiency of the network coding configuration for a packet transmitted via a sidelink channel from a second UE to the first UE. The operations of 2110 may be performed in accordance with examples as disclosed herein. In some examples, aspects of the operations of 2110 may be performed by a sidelink feedback receiver 1230 as described with reference to FIG. 12.

At 2115, the method may include receiving, in the message, a redundancy parameter. The operations of 2115 may be performed in accordance with examples as disclosed herein. In some examples, aspects of the operations of 2115 may be performed by a sidelink feedback receiver 1230 as described with reference to FIG. 12.

At 2120, the method may include transmitting, to the second UE, one or more second network coding parameters associated with the network coding configuration based on the information that indicates the efficiency of the network coding configuration, where the one or more second network coding parameters are different from the one or more first network coding parameters. The operations of 2120 may be performed in accordance with examples as disclosed herein. In some examples, aspects of the operations of 2120 may be performed by a network coding manager 1225 as described with reference to FIG. 12.

At 2125, the method may include where the one or more second network coding parameters are based on the redundancy parameter. The operations of 2125 may be performed in accordance with examples as disclosed herein. In some examples, aspects of the operations of 2125 may be performed by a network coding manager 1225 as described with reference to FIG. 12.

The following provides an overview of aspects of the present disclosure:

Aspect 1: A method for wireless communication at a first UE, comprising: receiving, from a base station, one or more network coding parameters associated with a network coding configuration for sidelink communications for the first UE; receiving, from a second UE via a sidelink channel, a packet encoded according to the network coding configuration; decoding the packet based at least in part on the one or more network coding parameters received from the base station; and transmitting a message comprising information that indicates an efficiency of the network coding configuration for the sidelink channel based at least in part on the decoding of the packet.

Aspect 2: The method of aspect 1, further comprising: estimating a loss probability for the packet, wherein the information that indicates the efficiency of the network coding configuration for the sidelink channel comprises the estimated loss probability.

Aspect 3: The method of aspect 2, wherein estimating the loss probability comprises: estimating the loss probability based at least in part on a number of packets received by the first UE during a time period and a total number of packets transmitted by the second UE during the time period.

Aspect 4: The method of any of aspects 1 through 3, further comprising: estimating a loss probability for the packet; and generating a redundancy parameter based at least in part on the estimated loss probability, wherein the information that indicates the efficiency of the network coding configuration for the sidelink channel comprises the redundancy parameter.

Aspect 5: The method of aspect 4, further comprising: receiving, via a control message, an indication of a lookup table for the UE, wherein the redundancy parameter is generated at least in part on the lookup table.

Aspect 6: The method of any of aspects 1 through 5, further comprising: transmitting, as part of the information that indicates the efficiency of the network coding configuration for the sidelink channel, a request to increase a redundancy parameter of the network coding configuration based at least in part on determining that the decoding of the packet was unsuccessful.

Aspect 7: The method of any of aspects 1 through 6, further comprising: transmitting, as part of the information that indicates the efficiency of the network coding configuration for the sidelink channel, a request to decrease a redundancy parameter of the network coding configuration based at least in part on determining that the decoding of the packet was successful.

Aspect 8: The method of any of aspects 1 through 7, wherein receiving the one or more network coding parameters comprises: receiving the one or more network coding parameters associated with the network coding configuration for the first UE via a MAC-CE signal or via a DCI signal.

Aspect 9: The method of any of aspects 1 through 8, wherein transmitting the message comprising the information that indicates the efficiency of the network coding configuration for the sidelink channel comprises: transmitting the message via a MAC-CE signal or via a UCI signal.

Aspect 10: The method of any of aspects 1 through 9, wherein the one or more network coding parameters include at least one of a coding redundancy, a number of a set of packets including the packet, an encoding algorithm, a decoding algorithm, a resource allocation for the sidelink channel, or any combination thereof.

Aspect 11: The method of any of aspects 1 through 10, further comprising: receiving, from the base station, a request to transmit the information that indicates the efficiency of the network coding configuration for the sidelink channel, wherein the information is transmitted based at least in part on the request.

Aspect 12: The method of any of aspects 1 through 11, further comprising: transmitting, to the base station, a request to transmit the information that indicates the efficiency of the network coding configuration for the sidelink channel; and receiving from the base station, a grant in response to the request, wherein the information is transmitted based at least in part on the grant.

Aspect 13: The method of aspect 12, wherein the request to transmit the information that indicates the efficiency of the network coding configuration for the sidelink channel is based at least in part on one of a condition of the sidelink channel or a quality of service target associated with the sidelink channel.

Aspect 14: The method of any of aspects 1 through 13, further comprising: receiving, from the base station, one or more updated network coding parameters associated with the network coding configuration for the UE, wherein the one or more updated network coding parameters are different from the one or more network coding parameters; receiving, from the second UE via the sidelink channel, a second packet encoded according to the network coding configuration; and decoding the second packet based at least in part on the one or more updated network coding parameters.

Aspect 15: The method of any of aspects 1 through 14, wherein the message comprising the information that indicates the efficiency of the network coding configuration for the sidelink channel is transmitted to at least one of the base station or the second UE.

Aspect 16: A method for wireless communication at a base station, comprising: transmitting, to one or more UEs, one or more first network coding parameters associated with a network coding configuration for sidelink communications for the one or more UEs; receiving, from a first UE of the one or more UEs, a message comprising information that indicates an efficiency of the network coding configuration for a packet transmitted via a sidelink channel from a second UE to the first UE; and transmitting, to the second UE, one or more second network coding parameters associated with the network coding configuration based at least in part on the information that indicates the efficiency of the network coding configuration, wherein the one or more second network coding parameters are different from the one or more first network coding parameters.

Aspect 17: The method of aspect 16, further comprising: receiving, in the message, an estimated loss probability for the sidelink channel; and generating a redundancy parameter based at least in part on the estimated loss probability, wherein the one or more second network coding parameters are based at least in part on the redundancy parameter.

Aspect 18: The method of any of aspects 16 through 17, further comprising: receiving, in the message, a redundancy parameter; and wherein the one or more second network coding parameters are based at least in part on the redundancy parameter.

Aspect 19: The method of aspect 18, further comprising: transmitting, via a control message, an indication of a lookup table for the first UE, wherein the redundancy parameter is based at least in part on the lookup table.

Aspect 20: The method of any of aspects 16 through 19, wherein receiving the information that indicates the efficiency of the network coding configuration comprises: receiving a request to decrease a redundancy parameter of the network coding configuration, wherein the one or more second network coding parameters comprises a decreased redundancy parameter.

Aspect 21: The method of any of aspects 16 through 20, wherein receiving the information that indicates the efficiency of the network coding configuration comprises: receiving a request to increase a redundancy parameter of the network coding configuration, wherein the one or more second network coding parameters comprises an increased redundancy parameter.

Aspect 22: The method of any of aspects 16 through 21, wherein transmitting the one or more first network coding parameters associated with the network coding configuration comprises: transmitting the one or more first network coding parameters associated with the network coding configuration via a MAC-CE signal or via a DCI signal.

Aspect 23: The method of any of aspects 16 through 22, wherein the information that indicates the efficiency of the network coding configuration is received via a MAC-CE signal or via a UCI signal.

Aspect 24: The method of any of aspects 16 through 23, wherein the one or more first network coding parameters include at least one of a coding redundancy, a number of subpackets per packet, an encoding algorithm, a decoding algorithm, or a resource allocation for the sidelink channel.

Aspect 25: The method of any of aspects 16 through 24, further comprising: transmitting, to the first UE, a request to transmit the information that indicates the efficiency of the network coding configuration for the sidelink channel.

Aspect 26: The method of aspect 25 wherein the request to transmit the information that indicates the efficiency of the network coding configuration for the sidelink channel is based at least in part on one of a condition of the sidelink channel or a quality of service target associated with the sidelink channel.

Aspect 27: The method of any of aspects 16 through 26, further comprising: receiving, from the first UE, a request to transmit the information that indicates the efficiency of the network coding configuration for the sidelink channel; and transmitting, to the first UE, a grant in response to the request based at least in part on one of a condition of the sidelink channel or a quality of service target associated with the sidelink channel.

Aspect 28: An apparatus for wireless communication at a first UE, comprising a processor; memory coupled with the processor; and instructions stored in the memory and executable by the processor to cause the apparatus to perform a method of any of aspects 1 through 15.

Aspect 29: An apparatus for wireless communication at a first UE, comprising at least one means for performing a method of any of aspects 1 through 15.

Aspect 30: A non-transitory computer-readable medium storing code for wireless communication at a first UE, the code comprising instructions executable by a processor to perform a method of any of aspects 1 through 15.

Aspect 31: An apparatus for wireless communication at a base station, comprising a processor; memory coupled with the processor; and instructions stored in the memory and executable by the processor to cause the apparatus to perform a method of any of aspects 16 through 27.

Aspect 32: An apparatus for wireless communication at a base station, comprising at least one means for performing a method of any of aspects 16 through 27.

Aspect 33: A non-transitory computer-readable medium storing code for wireless communication at a base station, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    receiving, from a network device, one or more network coding parameters associated with a network coding configuration for sidelink communications for the first UE;
    receiving, from a second UE via a sidelink channel, a packet encoded according to the network coding configuration;
    decoding the packet based at least in part on the one or more network coding parameters received from the network device; and
    transmitting a message comprising information that indicates an efficiency of the network coding configuration for the sidelink channel based at least in part on the decoding of the packet, wherein the efficiency of the network coding configuration for the sidelink channel comprises a loss probability estimated for the packet based at least in part on a quantity of packets received by the first UE during a time period and a total quantity of packets transmitted by the second UE during the time period.

2. The method of claim 1, further comprising:
    estimating the loss probability for the packet; and
    generating a redundancy parameter based at least in part on the loss probability, wherein the information that indicates the efficiency of the network coding configuration for the sidelink channel comprises the redundancy parameter.

3. The method of claim 2, further comprising:
    receiving, via a control message, an indication of a lookup table for the UE, wherein the redundancy parameter is generated at least in part on the lookup table.

4. The method of claim 1, further comprising:
    transmitting, as part of the information that indicates the efficiency of the network coding configuration for the sidelink channel, a request to increase a redundancy parameter of the network coding configuration based at least in part on the decoding of the packet being unsuccessful.

5. The method of claim 1, further comprising:
    transmitting, as part of the information that indicates the efficiency of the network coding configuration for the sidelink channel, a request to decrease a redundancy parameter of the network coding configuration based at least in part on the decoding of the packet being successful.

6. The method of claim 1, wherein receiving the one or more network coding parameters comprises:
    receiving the one or more network coding parameters associated with the network coding configuration for the first UE via a medium access control control element (MAC-CE) signal or via a downlink control information (DCI) signal.

7. The method of claim 1, wherein transmitting the message comprising the information that indicates the efficiency of the network coding configuration for the sidelink channel comprises:
    transmitting the message via a medium access control control element (MAC-CE) signal or via an uplink control information (UCI) signal.

8. The method of claim 1, wherein the one or more network coding parameters include at least one of a coding redundancy, a quantity of a set of packets including the packet, an encoding algorithm, a decoding algorithm, a resource allocation for the sidelink channel, or any combination thereof.

9. The method of claim 1, further comprising:
receiving, from the network device, a request to transmit the information that indicates the efficiency of the network coding configuration for the sidelink channel, wherein the information is transmitted based at least in part on the request.

10. The method of claim 1, further comprising:
transmitting, to the network device, a request to transmit the information that indicates the efficiency of the network coding configuration for the sidelink channel; and
receiving, from the network device, a grant in response to the request, wherein the information is transmitted based at least in part on the grant.

11. The method of claim 10, wherein the request to transmit the information that indicates the efficiency of the network coding configuration for the sidelink channel is based at least in part on one of a condition of the sidelink channel or a quality of service target associated with the sidelink channel.

12. The method of claim 1, further comprising:
receiving, from the network device, one or more updated network coding parameters associated with the network coding configuration for the UE, wherein the one or more updated network coding parameters are different from the one or more network coding parameters;
receiving, from the second UE via the sidelink channel, a second packet encoded according to the network coding configuration; and
decoding the second packet based at least in part on the one or more updated network coding parameters.

13. The method of claim 1, wherein the message comprising the information that indicates the efficiency of the network coding configuration for the sidelink channel is transmitted to at least one of the network device or the second UE.

14. A method for wireless communication at a network device, comprising:
transmitting, to one or more user equipments (UEs), one or more first network coding parameters associated with a network coding configuration for sidelink communications for the one or more UEs;
receiving, from a first UE of the one or more UEs, a message comprising information that indicates an efficiency of the network coding configuration for a packet transmitted via a sidelink channel from a second UE to the first UE, wherein the efficiency of the network coding configuration for the sidelink channel comprises a loss probability estimated for the packet based at least in part on a quantity of packets received by the first UE during a time period and a total quantity of packets transmitted by the second UE during the time period; and
transmitting, to the second UE, one or more second network coding parameters associated with the network coding configuration based at least in part on the information that indicates the efficiency of the network coding configuration, wherein the one or more second network coding parameters are different from the one or more first network coding parameters.

15. The method of claim 14, further comprising:
receiving, in the message, the loss probability; and
generating a redundancy parameter based at least in part on the loss probability, wherein the one or more second network coding parameters are based at least in part on the redundancy parameter.

16. The method of claim 14, further comprising:
receiving, in the message, a redundancy parameter, wherein the one or more second network coding parameters are based at least in part on the redundancy parameter.

17. The method of claim 16, further comprising:
transmitting, via a control message, an indication of a lookup table for the first UE, wherein the redundancy parameter is based at least in part on the lookup table.

18. The method of claim 14, wherein receiving the information that indicates the efficiency of the network coding configuration comprises:
receiving a request to decrease a redundancy parameter of the network coding configuration, wherein the one or more second network coding parameters comprises a decreased redundancy parameter.

19. The method of claim 14, wherein receiving the information that indicates the efficiency of the network coding configuration comprises:
receiving a request to increase a redundancy parameter of the network coding configuration, wherein the one or more second network coding parameters comprises an increased redundancy parameter.

20. The method of claim 14, wherein transmitting the one or more first network coding parameters associated with the network coding configuration comprises:
transmitting the one or more first network coding parameters associated with the network coding configuration via a medium access control control element (MAC-CE) signal or via a downlink control information (DCI) signal.

21. The method of claim 14, wherein the information that indicates the efficiency of the network coding configuration is received via a medium access control control element (MAC-CE) signal or via an uplink control information (UCI) signal.

22. The method of claim 14, wherein the one or more first network coding parameters include at least one of a coding redundancy, a quantity of subpackets per packet, an encoding algorithm, a decoding algorithm, or a resource allocation for the sidelink channel.

23. The method of claim 14, further comprising:
transmitting, to the first UE, a request to transmit the information that indicates the efficiency of the network coding configuration for the sidelink channel.

24. The method of claim 23, wherein the request to transmit the information that indicates the efficiency of the network coding configuration for the sidelink channel is based at least in part on one of a condition of the sidelink channel or a quality of service target associated with the sidelink channel.

25. The method of claim 14, further comprising:
receiving, from the first UE, a request to transmit the information that indicates the efficiency of the network coding configuration for the sidelink channel; and
transmitting, to the first UE, a grant in response to the request based at least in part on one of a condition of the sidelink channel or a quality of service target associated with the sidelink channel.

26. An apparatus for wireless communication at a first user equipment (UE), comprising:

a processor;
memory coupled with the processor; and
instructions stored in the memory and executable by the processor to cause the apparatus to:
receive, from a network device, one or more network coding parameters associated with a network coding configuration for sidelink communications for the first UE;
receive, from a second UE via a sidelink channel, a packet encoded according to the network coding configuration;
decode the packet based at least in part on the one or more network coding parameters received from the network device; and
transmit a message comprising information that indicates an efficiency of the network coding configuration for the sidelink channel based at least in part on the decoding of the packet, wherein the efficiency of the network coding configuration for the sidelink channel comprises a loss probability estimated for the packet based at least in part on a quantity of packets received by the first UE during a time period and a total quantity of packets transmitted by the second UE during the time period.

27. The apparatus of claim 26, wherein the instructions stored in the memory are further executable by the processor to cause the apparatus to:
estimate the loss probability for the packet; and
generate a redundancy parameter based at least in part on the loss probability, wherein the information that indicates the efficiency of the network coding configuration for the sidelink channel comprises the redundancy parameter.

28. An apparatus for wireless communication at a network device, comprising:
a processor;
memory coupled with the processor; and
instructions stored in the memory and executable by the processor to cause the apparatus to:
transmit, to one or more user equipments (UEs), one or more first network coding parameters associated with a network coding configuration for sidelink communications for the one or more UEs;
receive, from a first UE of the one or more UEs, a message comprising information that indicates an efficiency of the network coding configuration for a packet transmitted via a sidelink channel from a second UE to the first UE, wherein the efficiency of the network coding configuration for the sidelink channel comprises an loss probability estimated for the packet based at least in part on a quantity of packets received by the first UE during a time period and a total quantity of packets transmitted by the second UE during the time period; and
transmit, to the second UE, one or more second network coding parameters associated with the network coding configuration based at least in part on the information that indicates the efficiency of the network coding configuration, wherein the one or more second network coding parameters are different from the one or more first network coding parameters.

* * * * *